(12) United States Patent
Nakano et al.

(10) Patent No.: US 8,427,142 B2
(45) Date of Patent: Apr. 23, 2013

(54) ROTATION ANGLE DETECTING DEVICE

(75) Inventors: Masatsugu Nakano, Tokyo (JP);
Shinsuke Henmi, Tokyo (JP); Satoru Akutsu, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 271 days.

(21) Appl. No.: 12/994,772

(22) PCT Filed: May 19, 2009

(86) PCT No.: PCT/JP2009/059226
§ 371 (c)(1),
(2), (4) Date: Nov. 26, 2010

(87) PCT Pub. No.: WO2009/145085
PCT Pub. Date: Dec. 3, 2009

(65) Prior Publication Data
US 2011/0074400 A1     Mar. 31, 2011

(30) Foreign Application Priority Data
May 27, 2008   (JP) .................................. 2008-138110

(51) Int. Cl.
*G01B 7/30*   (2006.01)

(52) U.S. Cl.
USPC .................. 324/207.25; 324/200; 324/207.23

(58) Field of Classification Search .................. None
See application file for complete search history.

(56) References Cited

U.S. PATENT DOCUMENTS 7,148,599 B2   12/2006 Aoyama et al.
7,268,537 B2    9/2007 Nakano et al.
(Continued)

FOREIGN PATENT DOCUMENTS

DE   102 55 888 A1   12/2003
EP   1 416 254 A1    5/2004
(Continued)

OTHER PUBLICATIONS

International Search Report issued Jun. 30, 2009 in PCT/JP09/059226 filed May 19, 2009.
(Continued)

*Primary Examiner* — Jermele M Hollington
*Assistant Examiner* — Trung Nguyen
(74) *Attorney, Agent, or Firm* — Oblon, Spivak, McClelland, Maier & Neustadt, L.L.P.

(57) ABSTRACT

Provided is a rotation angle detecting device with high detection accuracy, which can be structured with a small number of teeth even if a shaft angle multiplier increases, thus enhancing winding workability and becoming suitable for mass production. The rotation angle detecting device includes: a stator formed of an iron core with teeth, the stator including: an exciting winding of one phase or more; and output windings of two phases or more; and a rotor with a salient pole, in which numbers of turns of the output windings of the two phases each have a value obtained by a function containing a sum or a difference between a sine wave of an order equal to an absolute value of a sum of a number of the salient poles and a number of the pole pairs, and a sine wave of an order equal to an integer that is different from an absolute value of the number of the pole pairs of the exciting winding and different from an absolute value of a difference obtained by subtracting the number of the salient poles from the number of the pole pairs.

10 Claims, 24 Drawing Sheets

U.S. PATENT DOCUMENTS

| | | | |
|---|---|---|---|
| 8,179,079 B2 * | 5/2012 | Mukai et al. | 318/661 |
| 8,212,513 B2 * | 7/2012 | Wuerstlein et al. | 318/542 |
| 2009/0184598 A1 | 7/2009 | Nakano et al. | |
| 2009/0251023 A1 | 10/2009 | Nakano et al. | |
| 2010/0295403 A1 | 11/2010 | Morita et al. | |

FOREIGN PATENT DOCUMENTS

| | | |
|---|---|---|
| EP | 1 498 699 A1 | 1/2005 |
| EP | 1 498 699 B1 | 1/2005 |
| JP | 2003 307436 | 10/2003 |
| JP | 2004 151040 | 5/2004 |
| JP | 2004 251733 | 9/2004 |

OTHER PUBLICATIONS

German Office Action issued May 7, 2012, in German Patent Application No. 11 2009 001 282.5 (with English translation).

\* cited by examiner

| TOOTH NUMBER | NUMBER OF TURNS | | |
|---|---|---|---|
| | EXCITING WINDING | COS WINDING | SIN WINDING |
| 1 | 50 | 81.23 | 50.00 |
| 2 | -50 | 81.23 | 88.20 |
| 3 | 50 | 0.00 | 76.39 |
| 4 | -50 | -81.23 | 88.20 |
| 5 | 50 | -81.23 | 50.00 |
| 6 | -50 | -81.23 | -50.00 |
| 7 | 50 | -81.23 | -88.20 |
| 8 | -50 | 0.00 | -76.39 |
| 9 | 50 | 81.23 | -88.20 |
| 10 | -50 | 81.23 | -50.00 |

| TOOTH NUMBER | NUMBER OF TURNS | | |
|---|---|---|---|
| | EXCITING WINDING | COS WINDING | SIN WINDING |
| 1 | 50 | 81 | 50 |
| 2 | −50 | 81 | 88 |
| 3 | 50 | 0 | 76 |
| 4 | −50 | −81 | 88 |
| 5 | 50 | −81 | 50 |
| 6 | −50 | −81 | −50 |
| 7 | 50 | −81 | −88 |
| 8 | −50 | 0 | −76 |
| 9 | 50 | 81 | −88 |
| 10 | −50 | 81 | −50 |

| TOOTH NUMBER | NUMBER OF TURNS | | |
|---|---|---|---|
| | EXCITING WINDING | COS WINDING | SIN WINDING |
| 1 | 50 | 76.54 | 76.54 |
| 2 | −50 | 76.54 | 76.54 |
| 3 | 50 | −76.54 | 76.54 |
| 4 | −50 | −76.54 | 76.54 |
| 5 | 50 | −76.54 | −76.54 |
| 6 | −50 | −76.54 | −76.54 |
| 7 | 50 | 76.54 | −76.54 |
| 8 | −50 | 76.54 | −76.54 |

| TOOTH NUMBER | NUMBER OF TURNS | | |
|---|---|---|---|
| | EXCITING WINDING | COS WINDING | SIN WINDING |
| 1 | 50 | 77 | 77 |
| 2 | −50 | 77 | 77 |
| 3 | 50 | −77 | 77 |
| 4 | −50 | −77 | 77 |
| 5 | 50 | −77 | −77 |
| 6 | −50 | −77 | −77 |
| 7 | 50 | 77 | −77 |
| 8 | −50 | 77 | −77 |

|  | NUMBER OF TURNS | | |
|---|---|---|---|
| TOOTH NUMBER | EXCITING WINDING | COS WINDING | SIN WINDING |
| 1 | 50 | 83.65 | 38.82 |
| 2 | −50 | 83.65 | 83.65 |
| 3 | 50 | 38.82 | 83.65 |
| 4 | −50 | −38.82 | 83.65 |
| 5 | 50 | −83.65 | 83.65 |
| 6 | −50 | −83.65 | 38.82 |
| 7 | 50 | −83.65 | −38.82 |
| 8 | −50 | −83.65 | −83.65 |
| 9 | 50 | −38.82 | −83.65 |
| 10 | −50 | 38.82 | −83.65 |
| 11 | 50 | 83.65 | −83.65 |
| 12 | −50 | 83.65 | −38.82 |

|  | NUMBER OF TURNS | | |
|---|---|---|---|
| TOOTH NUMBER | EXCITING WINDING | COS WINDING | SIN WINDING |
| 1 | 50 | 84 | 39 |
| 2 | −50 | 84 | 84 |
| 3 | 50 | 39 | 84 |
| 4 | −50 | −39 | 84 |
| 5 | 50 | −84 | 84 |
| 6 | −50 | −84 | 39 |
| 7 | 50 | −84 | −39 |
| 8 | −50 | −84 | −84 |
| 9 | 50 | −39 | −84 |
| 10 | −50 | 39 | −84 |
| 11 | 50 | 84 | −84 |
| 12 | −50 | 84 | −39 |

| TOOTH NUMBER | NUMBER OF TURNS | | |
|---|---|---|---|
| | EXCITING WINDING | COS WINDING | SIN WINDING |
| 1 | 50 | 87.62 | 28.68 |
| 2 | −50 | 87.62 | 68.73 |
| 3 | 50 | 69.44 | 84.06 |
| 4 | −50 | 25.66 | 85.60 |
| 5 | 50 | −28.68 | 87.62 |
| 6 | −50 | −68.73 | 87.62 |
| 7 | 50 | −84.06 | 69.44 |
| 8 | −50 | −85.60 | 25.66 |
| 9 | 50 | −87.62 | −28.68 |
| 10 | −50 | −87.62 | −68.73 |
| 11 | 50 | −69.44 | −84.06 |
| 12 | −50 | −25.66 | −85.60 |
| 13 | 50 | 28.68 | −87.62 |
| 14 | −50 | 68.73 | −87.62 |
| 15 | 50 | 84.06 | −69.44 |
| 16 | −50 | 85.60 | −25.66 |

| TOOTH NUMBER | NUMBER OF TURNS | | |
|---|---|---|---|
| | EXCITING WINDING | COS WINDING | SIN WINDING |
| 1 | 50 | 88 | 29 |
| 2 | -50 | 88 | 69 |
| 3 | 50 | 69 | 84 |
| 4 | -50 | 26 | 86 |
| 5 | 50 | -29 | 88 |
| 6 | -50 | -69 | 88 |
| 7 | 50 | -84 | 69 |
| 8 | -50 | -86 | 26 |
| 9 | 50 | -88 | -29 |
| 10 | -50 | -88 | -69 |
| 11 | 50 | -69 | -84 |
| 12 | -50 | -26 | -86 |
| 13 | 50 | 29 | -88 |
| 14 | -50 | 69 | -88 |
| 15 | 50 | 84 | -69 |
| 16 | -50 | 86 | -26 |

| TOOTH NUMBER | NUMBER OF TURNS | | |
|---|---|---|---|
| | EXCITING WINDING | COS WINDING | SIN WINDING |
| 1 | 50 | 81.23 | 50.00 |
| 2 | −50 | 0.00 | 76.39 |
| 3 | 50 | −81.23 | 50.00 |
| 4 | −50 | −81.23 | −88.20 |
| 5 | 50 | 81.23 | −88.20 |
| 6 | −50 | 81.23 | 50.00 |
| 7 | 50 | 0.00 | 76.39 |
| 8 | −50 | −81.23 | 50.00 |
| 9 | 50 | −81.23 | −88.20 |
| 10 | −50 | 81.23 | −88.20 |

| TOOTH NUMBER | NUMBER OF TURNS | | |
|---|---|---|---|
| | EXCITING WINDING | COS WINDING | SIN WINDING |
| 1 | 50 | 81 | 50 |
| 2 | −50 | 0 | 76 |
| 3 | 50 | −81 | 50 |
| 4 | −50 | −81 | −88 |
| 5 | 50 | 81 | −88 |
| 6 | −50 | 81 | 50 |
| 7 | 50 | 0 | 76 |
| 8 | −50 | −81 | 50 |
| 9 | 50 | −81 | −88 |
| 10 | −50 | 81 | −88 |

| TOOTH NUMBER | NUMBER OF TURNS | | |
|---|---|---|---|
| | EXCITING WINDING | COS WINDING | SIN WINDING |
| 1 | 50 | 83.65 | 38.82 |
| 2 | −50 | 83.65 | 83.65 |
| 3 | 50 | 38.82 | 83.65 |
| 4 | −50 | −38.82 | 83.65 |
| 5 | 50 | −83.65 | 83.65 |
| 6 | −50 | −83.65 | 38.82 |
| 7 | 50 | −83.65 | −38.82 |
| 8 | −50 | −83.65 | −83.65 |
| 9 | 50 | −38.82 | −83.65 |
| 10 | −50 | 38.82 | −83.65 |
| 11 | 50 | 83.65 | −83.65 |
| 12 | −50 | 83.65 | −38.82 |

| TOOTH NUMBER | NUMBER OF TURNS | | |
|---|---|---|---|
| | EXCITING WINDING | COS WINDING | SIN WINDING |
| 1 | 50 | 84 | 39 |
| 2 | −50 | 84 | 84 |
| 3 | 50 | 39 | 84 |
| 4 | −50 | −39 | 84 |
| 5 | 50 | −84 | 84 |
| 6 | −50 | −84 | 39 |
| 7 | 50 | −84 | −39 |
| 8 | −50 | −84 | −84 |
| 9 | 50 | −39 | −84 |
| 10 | −50 | 39 | −84 |
| 11 | 50 | 84 | −84 |
| 12 | −50 | 84 | −39 |

| TOOTH NUMBER | NUMBER OF TURNS | | |
|---|---|---|---|
| | EXCITING WINDING | COS WINDING | SIN WINDING |
| 1 | 50 | 87.62 | 28.68 |
| 2 | −50 | 87.62 | 68.73 |
| 3 | 50 | 69.44 | 84.06 |
| 4 | −50 | 25.66 | 85.60 |
| 5 | 50 | −28.68 | 87.62 |
| 6 | −50 | −68.73 | 87.62 |
| 7 | 50 | −84.06 | 69.44 |
| 8 | −50 | −85.60 | 25.66 |
| 9 | 50 | −87.62 | −28.68 |
| 10 | −50 | −87.62 | −68.73 |
| 11 | 50 | −69.44 | −84.06 |
| 12 | −50 | −25.66 | −85.60 |
| 13 | 50 | 28.68 | −87.62 |
| 14 | −50 | 68.73 | −87.62 |
| 15 | 50 | 84.06 | −69.44 |
| 16 | −50 | 85.60 | −25.66 |

| TOOTH NUMBER | NUMBER OF TURNS | | |
|---|---|---|---|
| | EXCITING WINDING | COS WINDING | SIN WINDING |
| 1 | 50 | 88 | 29 |
| 2 | −50 | 88 | 69 |
| 3 | 50 | 69 | 84 |
| 4 | −50 | 26 | 86 |
| 5 | 50 | −29 | 88 |
| 6 | −50 | −69 | 88 |
| 7 | 50 | −84 | 69 |
| 8 | −50 | −86 | 26 |
| 9 | 50 | −88 | −29 |
| 10 | −50 | −88 | −69 |
| 11 | 50 | −69 | −84 |
| 12 | −50 | −26 | −86 |
| 13 | 50 | 29 | −88 |
| 14 | −50 | 69 | −88 |
| 15 | 50 | 84 | −69 |
| 16 | −50 | 86 | −26 |

ROTATION ANGLE DETECTING DEVICE

TECHNICAL FIELD

The present invention relates to a rotation angle detecting device for detecting a rotation angle of a rotor of, for example, a motor.

BACKGROUND ART

An optical encoder is used as a rotation angle detecting device, but is used in a restricted temperature environment, complex in structure, and expensive. Therefore, as a rotation angle detecting device which is simple in structure, inexpensive, and durable even in a high temperature environment, there have conventionally been devised rotation angle detecting devices using a change in permeance of a gap between a rotor and a stator. For example, there are disclosed a rotation angle detecting device including exciting windings of two phases and an output winding of one phase, a rotation angle detecting device including an exciting winding of one phase and output windings of two phases, and a rotation angle detecting device having the number of turns varying so as to match with a sine wave (see, for example, PTLs 1 to 4).

For example, the rotation angle detecting device disclosed in PTL 1 includes a stator formed of an iron core with teeth, around which an exciting winding of one or more phases and output windings of two or more phases are wound, and a rotor with a salient pole. As a shaft angle multiplier increases, the number of teeth also increases in proportion.

CITATION LIST

Patent Literature
[PTL 1] JP 62-58445 B
[PTL 2] JP 49-124508 A
[PTL 3] JP 08-178610 A
[PTL 4] JP 08-178611 A

SUMMARY OF INVENTION

Technical Problem

In the conventional rotation angle detecting devices, however, an increase in shaft angle multiplier causes an increase in number of teeth, which lowers winding workability and processability. Further, the increase in number of teeth results in a narrower slot width, which causes difficulty in inserting a nozzle of a winding machine. Thus, a problem is inherent in its unrealistic structure, which is not suitable for mass production in a case where the number of teeth increases as above.

In a case where the number of turns is varied depending on the sine wave as in PTLs 3 and 4, there exists a tooth having a winding with only a small number of turns. Considering a winding operation using a machine, a nozzle of an automatic winding machine needs to move to the tooth having a winding with only a small number of turns and a long period of time is required to align the nozzle, which leads to a problem of low efficiency of winding work.

It is an object of the present invention to provide a rotation angle detecting device with high detection accuracy, which can be structured with a small number of teeth even if a shaft angle multiplier increases, thus enhancing winding workability and becoming suitable for mass production.

Solution to Problem

A rotation angle detecting device according to the present invention includes: a stator formed of an iron core with teeth, the stator including: an exciting winding of one phase or more; and output windings of two phases or more; and a rotor with a salient pole, in which numbers of turns of the output windings each have a value obtained by a function containing a sum or a difference between a sine wave of a spatial order equal to an absolute value of a sum of a number M of the salient poles and a number N of pole pairs of excitation, and a sine wave of an order equal to an integer L that is different from an absolute value of the number N of pole pairs of excitation and different from an absolute value of a difference obtained by subtracting the number M of the salient poles from the number N of pole pairs.

Further, another rotation angle detecting device according to the present invention includes: a stator formed of an iron core with teeth, the stator including: an exciting winding of one phase or more; and output windings of two phases or more; and a rotor with a salient pole, in which numbers of turns of the output windings each have a value obtained by a function containing a sum or a difference between a sine wave of an order equal to an absolute value of a difference obtained by subtracting a number M of the salient poles from a number N of pole pairs of excitation, and a sine wave of an order equal to an integer L that is different from an absolute value of the number N of pole pairs of excitation and different from an absolute value of a sum of the number M of the salient poles and the number N of pole pairs.

Advantageous Effects of Invention

The rotation angle detecting device according to the present invention has an effect that the largest value of the number of turns can be made smaller than in the case of the conventional rotation angle detecting device, and is thus excellent in winding workability.

Further, even if the shaft angle multiplier increases, the rotation angle detecting device is structured with a smaller number of teeth than in the case of the conventional rotation angle detecting device, and is thus excellent in winding workability and suitable for mass production.

DESCRIPTION OF EMBODIMENTS

First Embodiment

Figure 1:
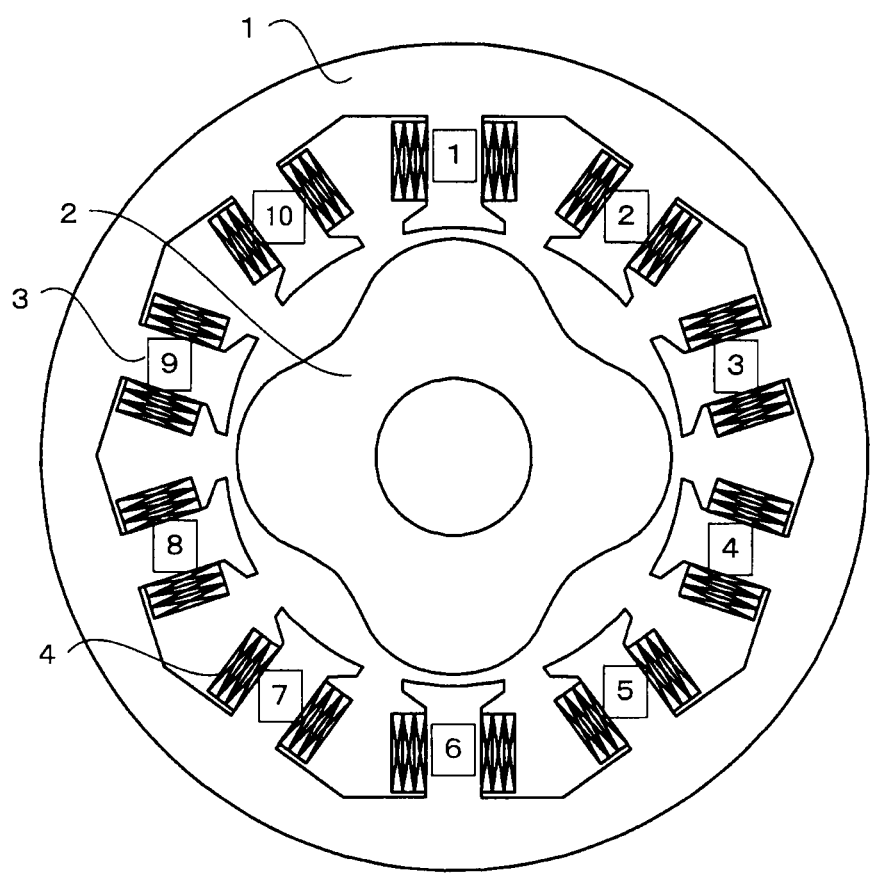
FIG. 1 A structural view illustrating a structure of a rotation angle detecting device according to a first embodiment of the present invention.

FIG. 1 is a structural view illustrating a structure of a rotation angle detecting device according to a first embodiment of the present invention.

The rotation angle detecting device according to the first embodiment of the present invention includes a stator 1 provided with teeth 3 and windings 4 wound around the teeth 3, and a rotor 2 with salient poles. For simple illustration, FIG. 1 only illustrates main parts of the rotation angle detecting device and omits details thereof such as an insulating member between the winding 4 and the tooth 3 and a connecting wire and a connection of the winding 4. FIG. 1 illustrates a rotation angle detecting device in which the number of the teeth 3 is 10 and a shaft angle multiplier is 4 (the number of salient poles of the rotor 2 is 4). Numerals placed on the teeth 3 are tooth numbers of the teeth 3 given for convenience.

The windings 4 include an exciting winding and an output winding. The windings 4 illustrated in FIG. 1 are wound around the tooth 3 to form a three-layer structure. For example, the exciting winding is wound around the tooth 3 on the inner peripheral layer side so as to be closest thereto, and the output windings of two phases are wound around the tooth 3 on the outer peripheral layer side. Note that, the manner of winding operation for the windings 4 is not limited thereto, and the output windings may be wound on the inner side or the windings may be wound so as to be arranged in a radial direction.

Next, description is given of an operation principle of the rotation angle detecting device according to the first embodiment of the present invention.

An alternating current voltage is applied to the exciting winding to supply an exciting current to the exciting winding. The frequency of the alternating current voltage is, for example, as high as about 10 kHz. Due to the current flowing through the exciting winding, a magnetic flux is generated in a gap between the stator 1 and the rotor 2 of the rotation angle detecting device, and also the magnetic flux is linked to the output winding wound around the stator. As a result, a voltage is generated in the output winding.

By the way, the rotor 2 has a shape with irregularity as illustrated in FIG. 1. In this example, the rotor 2 has a structure with four salient poles. With this structure, permeance between the stator 1 and the rotor 2 changes, and hence the magnetic flux generated in the gap portion is affected by this change in permeance.

Thus, the magnetic flux changes according to a rotation angle of the rotor 2, and as a result, the voltage generated in the output winding also changes. The number of turns is selected so that the voltages of the output windings of two phases have a relation of a sine wave and a cosine wave with respect to the rotation angle, and accordingly, when the voltages of the output windings of two phases are measured, the rotation angle can be detected.

Next, description is given of how to select the number of turns of the winding 4 in the rotation angle detecting device according to the first embodiment of the present invention.

Figures 2, 3:
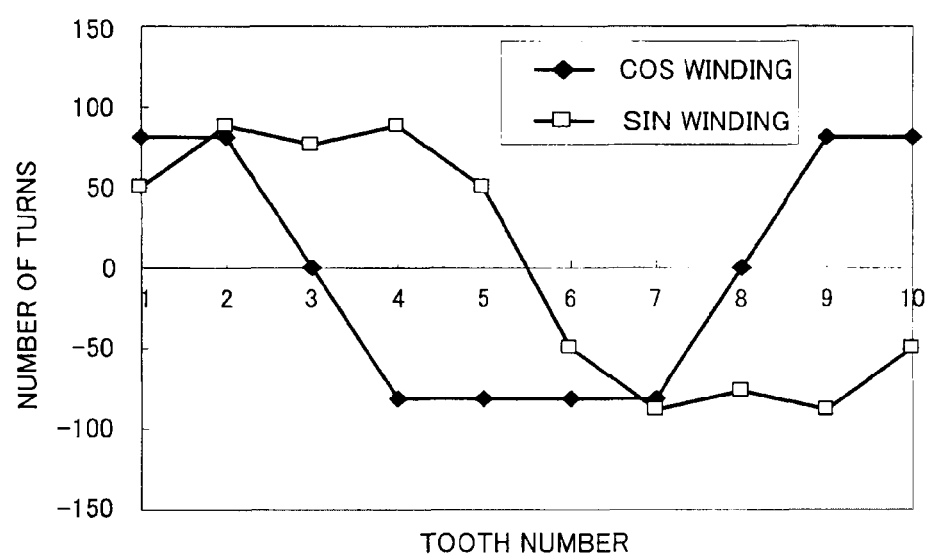
FIG. 2 A specific example of windings in the rotation angle detecting device according to the first embodiment of the present invention.
FIG. 3 A specific explanatory graph of the windings in the rotation angle detecting device according to the first embodiment of the present invention.

FIG. 2 is a specific example of the windings 4 in the rotation angle detecting device according to the first embodiment of the present invention. In FIG. 2, plus and minus signs represent winding directions, that is, the minus sign indicates that the winding is wound in a direction opposite to that of the plus sign, and numerals each represent the number of turns.

First, the exciting winding is described.

The exciting winding serves to generate a magnetic flux due to an exciting current flowing therethrough. In the example of FIG. 2, the exciting windings are wound around all the teeth 3 and the number of poles is 10, that is, the number of pole pairs is 5. Specifically, in the example of FIG. 2, 50 turns of the exciting windings are wound so that polarity differs between adjacent teeth 3.

On the other hand, a number M of salient poles of the rotor 2 is 4, that is, the change in permeance has a 4th spatial order, provided that a 1st order is defined as a component having a mechanical angle of 360° set as one period.

How the output windings are wound in this case is now considered.

To function as the rotation angle detecting device, the following magnetic flux needs to be captured from among the magnetic fluxes generated in the gap. Specifically, the magnetic flux has a spatial order equal to an absolute value of a value obtained by adding the shaft angle multiplier M to a number N of pole pairs of the exciting windings, or an absolute value of a value obtained by subtracting the shaft angle multiplier M from the number N of pole pairs of the excitation (hereinafter, when expressed in a mathematical expression, expressed as $\{|(\text{number of pole pairs of excitation}) \pm (\text{shaft angle multiplier})|, |N \pm N|\}$, where $||$ is a symbol representing an absolute value).

In the rotation angle detecting device illustrated in FIG. 1, because the number N of pole pairs of the exciting windings is 5 and the shaft angle multiplier M is 4, the magnetic flux that needs to be captured has a 9th or 1st spatial order, which is equal to the value |(number of pole pairs of excitation)±(shaft angle multiplier)|, that is, the value |5±4| (provided that the 1st spatial order represents a component having a mechanical angle of 360° set as one period).

To realize such a design that the output windings capture the magnetic flux of the 1st spatial order, the numbers of turns of the output windings with respect to the mechanical angle of each of the teeth 3 only need to vary according to a sine wave of the 1st spatial order. When one of the output windings of two phases is set as a COS winding, the other is set as a SIN winding, and $N_{cos}(i)$ and $N_{sin}(i)$ each represent the number of turns in the i-th (i is an integer of from 1 to a number $N_S$ of the teeth 3) tooth 3, $N_{cos}(i)$ may be expressed in Expression (1) and $N_{sin}(i)$ may be expressed in Expression (2), provided that $N_1$ is an arbitrary real number, $N_S$ is the number of the teeth 3, and $\theta_1$ and $\theta_2$ are arbitrary real numbers.

[Expression 1]

$$N_{cos}(i) = N_1 \cos\left(1 \times \frac{2\pi(i-1)}{N_s} + \frac{\pi}{N_s} + \theta_1\right) \quad (1)$$

$$N_{sin}(i) = N_1 \sin\left(1 \times \frac{2\pi(i-1)}{N_s} + \frac{\pi}{N_s} + \theta_2\right) \quad (2)$$

In this case, the largest value of the numbers of turns of the output windings of two phases is $N_1$. As the numbers of turns of the windings wound around the tooth 3 are smaller, a period of time required for winding work for the teeth 3 is shorter, and hence it is desired that the largest value of the number of turns be smaller. When comparing winding specifications in which the same output voltage is generated, the one smaller in largest value of the number of turns excels in mass productivity. Specifically, in the case where the number of turns is varied depending on the sine wave, the largest value of the numbers of turns increases and therefore a long period of time is required for winding work, which leads to a problem that mass productivity is lowered. Further, the numbers of turns of all the windings vary, which leads to a problem that the winding design is hard to understand.

In view of the above, the rotation angle detecting device according to the first embodiment of the present invention solves those problems by adding a component of a spatial order other than the 1st or 9th spatial order to Expressions (1) and (2). Another harmonic component is added so as to lower a peak value of the sine wave. Note that, a component of a spatial order equal to the number N of pole pairs of the excitation is avoided. When the component of the spatial order equal to the number N of pole pairs of the excitation is contained, a magnetic flux that is generated due to the exciting current and has an order equal to the number of pole pairs is captured, resulting in lower detection accuracy. Accordingly, the function as the rotation angle detecting device is lowered. In order to avoid this case, herein, a component of a 5th spatial order is avoided and a component of, for example, a 3rd spatial order is added. At this time, the number $N_{cos}(i)$ of turns of the COS winding is expressed in Expression (3) and the number $N_{sin}(i)$ of turns of the SIN winding is expressed in Expression (4), provided that $N_S$ is the number of slots, $N_1$, $N_2$, $\theta_1$, $\theta_2$, $\eta_1$, and $\eta_2$ are arbitrary real numbers, and the double sign is arbitrarily selected in each of Expressions (3) and (4).

[Expression 2]

$$N_{cos}(i) = \qquad (3)$$
$$N_1 \cos\left(1 \times \frac{2\pi(i-1)}{N_s} + \frac{\pi}{N_s} + \theta_1\right) \pm N_2 \cos\left(3 \times \frac{2\pi(i-1)}{N_s} + \frac{\pi}{N_s} + \eta_1\right)$$

$$N_{sin}(i) = \qquad (4)$$
$$N_1 \sin\left(1 \times \frac{2\pi(i-1)}{N_s} + \frac{\pi}{N_s} + \theta_2\right) \pm N_2 \sin\left(3 \times \frac{2\pi(i-1)}{N_s} + \frac{\pi}{N_s} + \eta_2\right)$$

Further, as a method of selecting $N_2$, the set value thereof satisfies that the numbers of turns of the COS windings are equal to each other in the 1st and 2nd teeth. Specifically, $N_{cos}(1)=N_{cos}(2)$ is solved, provided that $N_S=10$, $\theta_1=\theta_2=0$, and $\eta_1=\eta_2=216°$, and a ratio $N_2/N_1$ of $N_2$ to $N_1$ is expressed in Expression (5).

[Expression 3]

$$\frac{N_2}{N_1} = \frac{\cos\frac{3\pi}{10} - \cos\frac{\pi}{10}}{\cos\frac{13\pi}{10} - \cos\frac{19\pi}{10}} \approx 0.236 \quad (5)$$

In this manner, the numbers of turns can be made equal among the plurality of teeth 3, which produces an effect that the design of the number of turns becomes easier to understand and realize than in the case where the numbers of turns are different among all the teeth 3.

FIG. 2 illustrates the numbers of turns in each of the teeth 3, provided that $N_S=10$, $\theta_1=\theta_2=0$, $\eta_1=\eta_2=216°$, $N_1=100$, $N_2$ is set to the value in Expression (5), and as to the double sign, plus is used in Expression (3) while minus is used in Expression (4). Decimals may be accepted herein as the expression of the number of turns.

FIG. 3 is a graph illustrating the output windings of FIG. 2 with the axis of abscissa representing the tooth number and with the axis of ordinate representing the number of turns (including the signs).

Unlike the windings of the conventional rotation angle detecting device, in which the number of turns is varied sinusoidally, the numbers of turns are reduced in the vicinity of the peak values of the sine wave, specifically, for the COS winding, in the teeth 3 having the tooth numbers of 1, 5, 6, and 10 and for the SIN winding, in the teeth 3 having the tooth numbers of 3 and 8.

Figure 6:
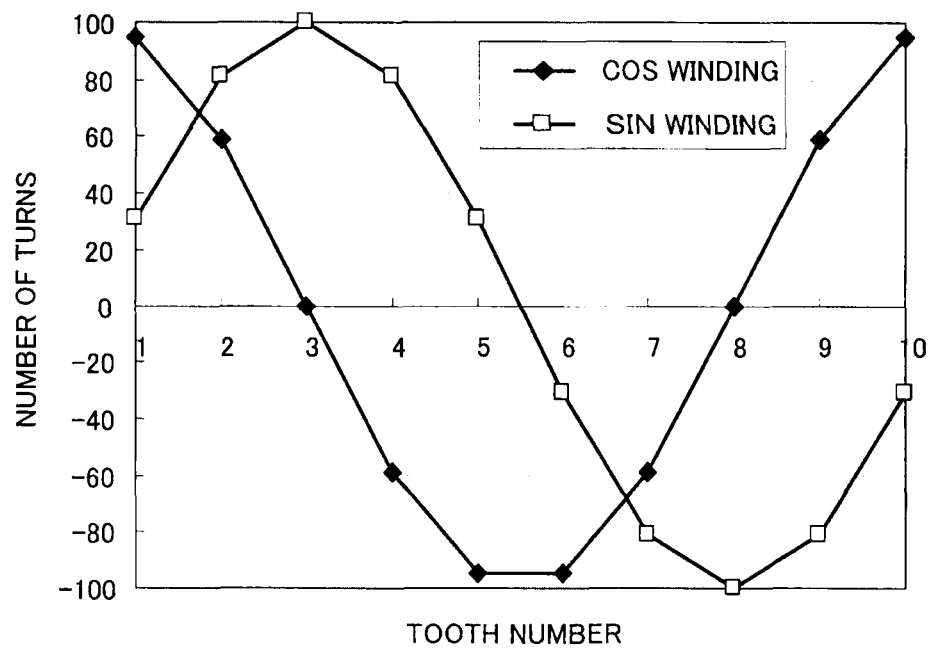
FIG. 6 An explanatory graph of a specific example of the numbers of turns in a conventional rotation angle detecting device.
Figure 7:
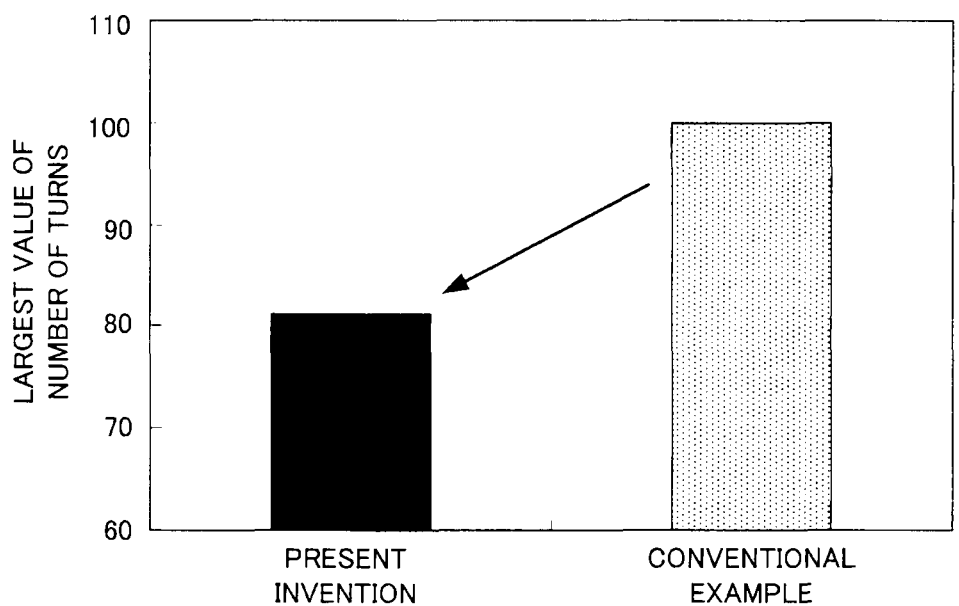
FIG. 7 An explanatory graph of comparison between the present invention and the conventional example.

In Expressions (1) and (2) that indicate the numbers of turns in the conventional rotation angle detecting device, when $N_1=100$, the numbers of turns are distributed as in FIG. 6. When the numbers of turns illustrated in FIGS. 3 and 6 are compared to each other, in the tooth having the tooth number of 3, for example, the number of turns exhibits the largest value in FIG. 6 but is reduced by about 20% in FIG. 3.

However, even when the largest number of turns is reduced, the output voltage is determined based on a parameter of the spatial order equal to the absolute value of the sum obtained by adding the shaft angle multiplier M to the number N of pole pairs of the excitation, or the absolute value of the difference obtained by subtracting the shaft angle multiplier M from the number N of pole pairs of the excitation. In this case, the output voltage is determined based on $N_1$ regarding the 1st spatial order, and hence the output voltage is the same. Thus, with the windings of the rotation angle detecting device according to the first embodiment of the present invention, the largest value of the number of turns can be reduced while the output voltage is the same, which produces an effect of enhancing the efficiency of the winding work.

Figures 4, 5:
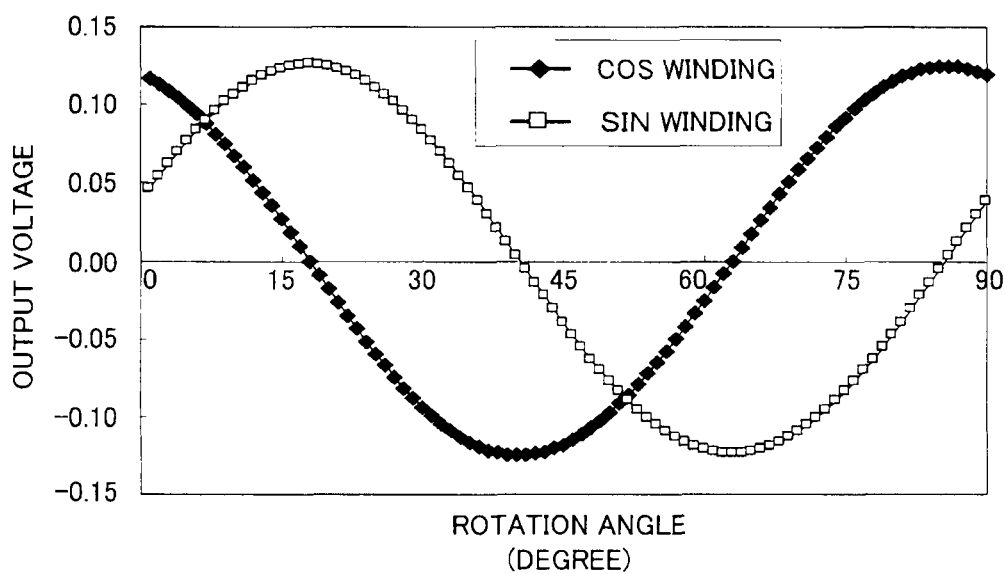
FIG. 4 Another specific example of the windings in the rotation angle detecting device according to the first embodiment of the present invention.
FIG. 5 An explanatory graph illustrating voltages of output windings in the rotation angle detecting device according to the first embodiment of the present invention.

FIG. 4 illustrates the numbers of turns in each of the teeth that are expressed as integers by rounding off the numbers of turns illustrated in FIG. 2. FIG. 5 is a plot of voltages of the output windings in this winding specification. In FIG. 5, the axis of abscissa represents a rotation angle being a mechanical angle and the axis of ordinate represents a peak value of the voltage. Plus and minus signs of the voltage represent a phase difference. For both the COS winding and the SIN winding, there is obtained a sine wave having a mechanical angle of 90° set as one period.

Further, the phase shift is 22.5°. 22.5 multiplied by the shaft angle multiplier of 4 equals 90°. In other words, the phase difference between the COS winding and the SIN winding is an electrical angle of 90°. This means that the device functions as a rotation angle detecting device in which the shaft angle multiplier is 4.

Further, it is confirmed from this fact that the device functions as a highly accurate rotation angle detecting device even if the numbers of turns are not strictly equal to the values of Expressions (3) and (4). In the example described herein, the number of turns is rounded off to the closest whole number, but the present invention is not limited thereto, and the same effect may be obtained also in a case where the number of turns is expressed as an integer by being truncated to the closest whole number. The waveforms illustrated in FIG. 5 are sinusoidal waveforms which hardly contain higher harmonics, and hence the highly accurate rotation angle detecting device can be obtained.

Further, in the case where the number of turns is varied depending on the sine wave as in PTLs 3 and 4, there exists a tooth 3 having a winding with only a small number of turns. Considering the winding operation for the windings 4 using a machine, a nozzle of an automatic winding machine needs to move to the tooth 3 having the winding 4 with only a small number of turns and a long period of time is required to align the nozzle, which leads to the problem of low efficiency of the winding work. In contrast, in the rotation angle detecting device according to the first embodiment of the present invention, there is no winding 4 with a small number of turns, with the result that the efficiency of the winding work is enhanced.

Further, in the winding specification of the rotation angle detecting device according to the first embodiment of the present invention, the numbers of turns of the COS windings are zero in the teeth 3 having the tooth numbers of 3 and 8. When there is such a tooth 3 in which the number of turns is zero, needless to say, an effect of enhancing the efficiency of the winding work is obtained because the tooth 3 does not need any winding operation by the winding machine.

Figure 8:
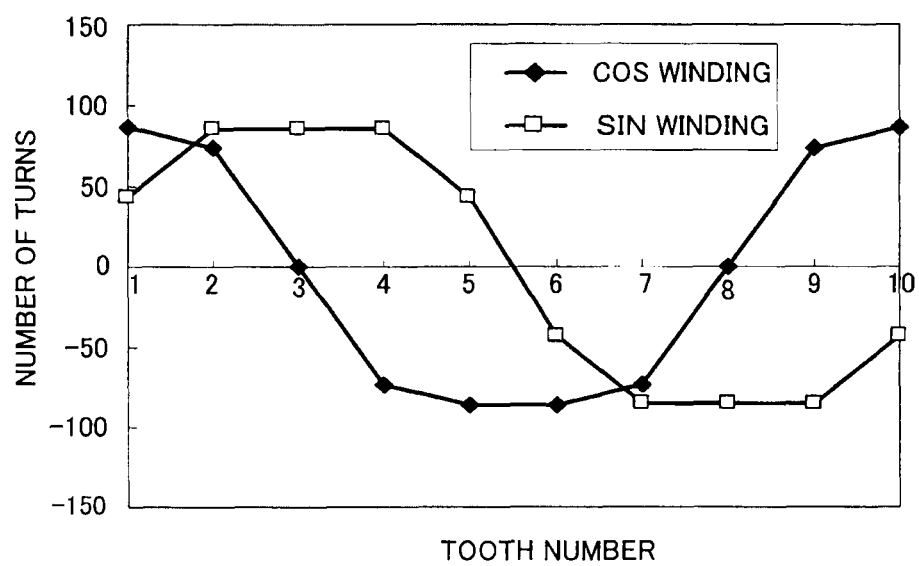
FIG. 8 An explanatory graph of the another specific example of the windings in the rotation angle detecting device according to the first embodiment of the present invention.

FIG. 8 is a graph illustrating the numbers of turns in each of the teeth 3, provided that $N_S=10$, $\theta_1=\theta_2=0$, $\eta_1=\eta_2=216°$, $N_1=100$, and $N_2=15$, which is different from the value obtained in Expression (5). FIG. 8 illustrates the numbers of turns, provided that, as to the double sign, plus is used in Expression (3) while minus is used in Expression (4). Even when the value of $N_2$ is different, the device functions as the rotation angle detecting device, and thus the same effect can be obtained.

Next, description is given of generalization of how to select the number of turns of the winding according to the first embodiment of the present invention.

When N represents the number of pole pairs of the excitation and M represents the number of salient poles of the rotor, in order to capture, from among the magnetic fluxes generated in the gap, a component of a spatial order equal to an absolute value of a sum obtained by adding the shaft angle multiplier M to the number N of pole pairs of the excitation, or an absolute value of a difference obtained by subtracting the shaft angle multiplier M from the number N of pole pairs of the excitation, the output winding is wound around the tooth 3 so that the number of turns varies depending on a waveform obtained by superimposing a sine wave of an order equal to the absolute value of the sum obtained by adding the shaft angle multiplier M to the number N of pole pairs of the excitation, or the absolute value of the difference obtained by subtracting the shaft angle multiplier M from the number N of pole pairs of the excitation, and a sine wave of an L-th order so as to reduce the largest value of the number of turns.

As the value L of the sine wave of the L-th order, which is superimposed so as to reduce the largest value of the number of turns, the value L has an absolute value different from an absolute value of N so as not to be equal to the number N of pole pairs of the excitation. In other words, L satisfies $|L| \neq |N|$.

Further, when the number N of pole pairs of the excitation is equal to half the value of the number $N_S$ of teeth, an $(|N+M|)$th spatial order and an $(|N-M|)$th spatial order are apparently the same in the distribution of the numbers of turns, and hence for convenience, L is an integer having the absolute value different from the absolute value of the difference obtained by subtracting the shaft angle multiplier M from the number N of pole pairs of the excitation. In other words, L satisfies $|L| \neq |N-M|$.

Note that, when the number N of pole pairs of the excitation is not equal to half the value of the number $N_S$ of teeth, L may be an integer having the absolute value equal to the absolute value of the difference obtained by subtracting the shaft angle multiplier M from the number N of pole pairs of the excitation. In other words, L may satisfy $|L|=|N-M|$.

In the rotation angle detecting device including the stator 1 with the exciting winding of one phase and the output windings of two phases, and the rotor 2 with the salient poles, when N represents the number of pole pairs of the excitation and M represents the number of salient poles of the rotor, the integer L satisfies $|L| \neq |N|$ and $|L| \neq |N-M|$, and the numbers of turns of the output windings of two phases are values obtained by a function containing a sum or difference between the sine wave of the $(|N+M|)$th spatial order and the sine wave of the L-th spatial order.

The above-mentioned fact is expressed in mathematical expressions in a further limited manner as follows.

Expressions (6) and (7) represent the numbers of turns of the output windings of two phases that are wound around the i-th tooth 3. $N_{cos}(i)$ and $N_{sin}(i)$ each represent the number of turns of the output winding wound around the i-th tooth 3. N represents the number of pole pairs of the exciting windings, M represents the number of salient poles of the rotor, and $N_S$ represents the number of teeth. L is an integer, $N_1$, $N_2$, $\theta_1$, $\theta_2$, $\eta_1$, and $\eta_2$ are arbitrary real numbers, and the double sign is arbitrary in each of Expressions (6) and (7).

[Expression 4]

$$N_{cos}(i) = N_1 \cos\left((N+M) \times \frac{2\pi(i-1)}{N_s} + \frac{\pi}{N_s} + \theta_1\right) \pm \quad (6)$$
$$N_2 \cos\left(L \times \frac{2\pi(i-1)}{N_s} + \frac{\pi}{N_s} + \theta_1\right)$$

$$N_{sin}(i) = N_1 \sin\left((N+M) \times \frac{2\pi(i-1)}{N_s} + \frac{\pi}{N_s} + \theta_2\right) \pm \quad (7)$$
$$N_2 \sin\left(L \times \frac{2\pi(i-1)}{N_s} + \frac{\pi}{N_s} + \theta_2\right)$$

On the other hand, in a case where the component of the $(|N-M|)$th spatial order is captured, the integer L has the absolute value different from the absolute value of the number N of pole pairs of the exciting windings so as to avoid a component of the order equal to the number N of pole pairs of the excitation.

Further, when the number N of pole pairs of the excitation is equal to half the value of the number $N_S$ of teeth, the $(|N+M|)$th spatial order and the $(|N-M|)$th spatial order are apparently the same in the distribution of the numbers of turns, and hence for convenience, the integer L is regarded to have the absolute value different from the absolute value of the sum obtained by adding the number M of salient poles of the rotor to the number N of pole pairs of the exciting windings.

Further, when the number N of pole pairs of the excitation is not equal to half the value of the number $N_S$ of teeth, the integer L may have the absolute value equal to the absolute value of the sum obtained by adding the number M of salient poles of the rotor to the number N of pole pairs of the exciting windings.

The above-mentioned fact is expressed in mathematical expressions in a further limited manner as follows.

Expressions (8) and (9) represent the numbers of turns of the output windings of two phases that are wound around the i-th tooth 3. $N_{cos}(i)$ and $N_{sin}(i)$ each represent the number of turns of the output winding wound around the i-th tooth 3. N represents the number of pole pairs of the exciting windings, M represents the number of salient poles of the rotor, and $N_S$ represents the number of teeth. L is an integer, $N_1$, $N_2$, $\theta_1$, $\theta_2$, $\eta_1$, and $\eta_2$ are arbitrary real numbers, and the double sign is arbitrary in each of Expressions (8) and (9).

[Expression 5]

$$N_{cos}(i) = N_1 \cos\left((N-M) \times \frac{2\pi(i-1)}{N_s} + \frac{\pi}{N_s} + \theta_1\right) \pm \quad (8)$$
$$N_2 \cos\left(L \times \frac{2\pi(i-1)}{N_s} + \frac{\pi}{N_s} + \eta_1\right)$$

$$N_{sin}(i) = N_1 \sin\left((N-M) \times \frac{2\pi(i-1)}{N_s} + \frac{\pi}{N_s} + \theta_2\right) \pm \quad (9)$$
$$N_2 \sin\left(L \times \frac{2\pi(i-1)}{N_s} + \frac{\pi}{N_s} + \eta_2\right)$$

Note that, the present invention is realized irrespective of whether or not the number N of pole pairs of the excitation is equal to half the value of the number $N_S$ of teeth.

The description has been given of the specific example of the 1st spatial order alone. When the $(|N+M|)$th spatial order is used, alternatively, N+M=5+4, that is, the 9th order is obtained in this embodiment, but the same windings are obtained by setting L=3 or 27, with the result that the same effect can be obtained.

With the above-mentioned structure, the largest value of the number of turns can be made smaller than in the conventional example, which produces an effect that winding workability is excellent.

In the conventional example, the number of teeth is proportional to the shaft angle multiplier. When the shaft angle multiplier is 4, for example, the number of teeth is equal to the number obtained by multiplying 4 in a case of the shaft angle multiplier of 1, by 4, that is, 4×4=16. As in this case, the number of the teeth 3 becomes large and accordingly the winding workability is lowered. In contrast, according to the present invention, even when the shaft angle multiplier is 4, the number of the teeth 3 is 10. Accordingly, the rotation angle detecting device with a smaller number of the teeth 3 than in the conventional example even if the shaft angle multiplier increases can be provided.

Thus, the rotation angle detecting device according to the first embodiment of the present invention has a structure excellent in winding workability and suitable for mass production.

Second Embodiment

The present invention is not only realized in the case where the number of the teeth 3 is 10 and the shaft angle multiplier is 4, but is also realized in various specifications.

Figure 9:
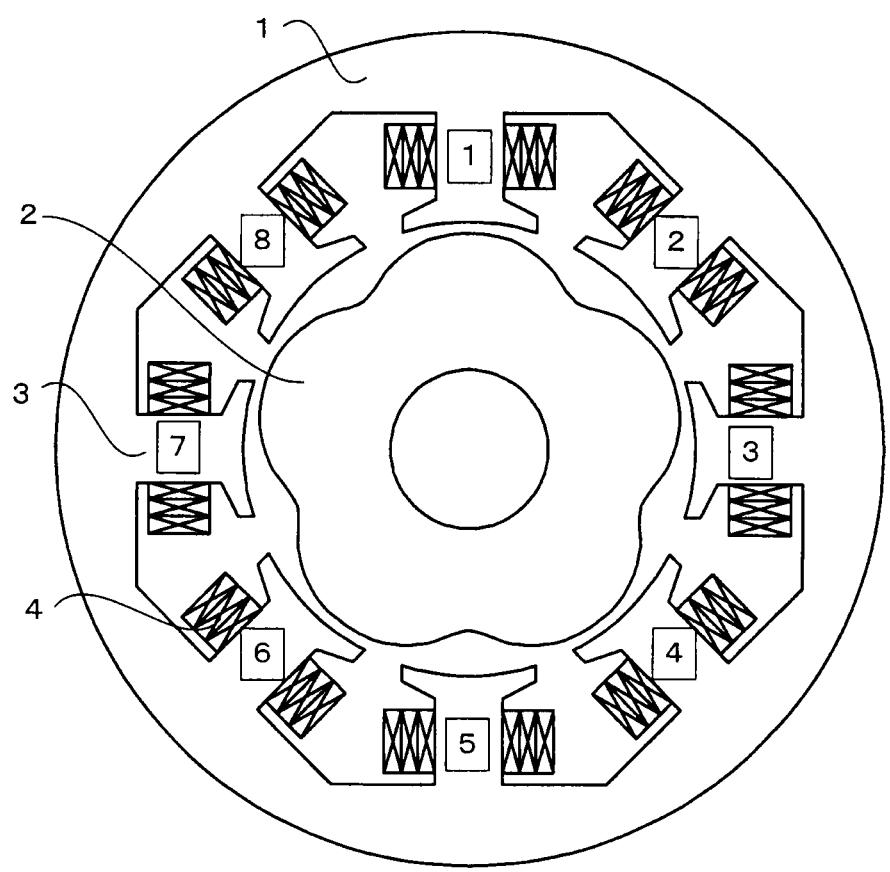
FIG. 9 A structural view illustrating a structure of a rotation angle detecting device according to a second embodiment of the present invention.

FIG. 9 is a structural view illustrating a structure of a rotation angle detecting device according to a second embodiment of the present invention.

The rotation angle detecting device according to the second embodiment of the present invention includes a stator 1 provided with teeth 3 and windings 4 wound around the teeth 3, and a rotor 2 with salient poles. For simple illustration, FIG. 9 only illustrates main parts of the rotation angle detecting device and omits details thereof such as an insulating member between the winding 4 and the tooth 3 and a connecting wire and a connection of the winding 4.

The rotation angle detecting device illustrated in FIG. 9 is an example in which the number of the teeth 3 is 8 and a shaft angle multiplier is 5 (the number of salient poles of the rotor 2 is 5). Numerals placed on the tooth 3 portions are tooth numbers of the teeth 3 given for convenience.

An operation principle of the device as the rotation angle detecting device is the same as that in the first embodiment.

A number N of pole pairs of the excitation is 4 and a number M of salient poles of the rotor is 5 in this embodiment. Therefore, a value |(number of pole pairs of excitation)±(shaft angle multiplier)|, that is, a value |N±M| is 1 or 9, and hence, from among the magnetic fluxes generated in the gap, a component of a 1st spatial order or a 9th spatial order only needs to be captured in the output windings. Further, there only needs to be added a component of an order that allows the largest value of the number of turns to be made smaller than in the conventional case where the number of turns is varied depending on the sine wave. In this embodiment, a case where a component of the 1st spatial order is captured is considered. An order L of the component to be added is set as the 3rd order. At this time, the numbers of turns are expressed in Expressions (10) and (11).

[Expression 6]

$$N_{cos}(i) = \qquad (10)$$
$$N_1 \cos\left(1 \times \frac{2\pi(i-1)}{N_s} + \frac{\pi}{N_s} + \theta_1\right) \pm N_2 \cos\left(3 \times \frac{2\pi(i-1)}{N_s} + \frac{\pi}{N_s} + \eta_1\right)$$

$$N_{sin}(i) = \qquad (11)$$
$$N_1 \sin\left(1 \times \frac{2\pi(i-1)}{N_s} + \frac{\pi}{N_s} + \theta_2\right) \pm N_2 \sin\left(3 \times \frac{2\pi(i-1)}{N_s} + \frac{\pi}{N_s} + \eta_2\right)$$

Figures 10, 11:
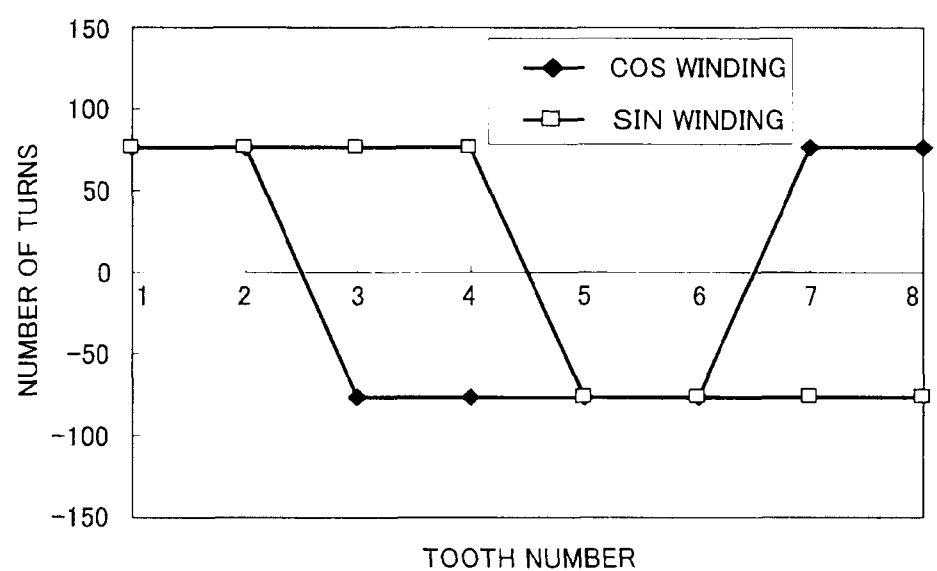
FIG. 10 A specific example of windings in the rotation angle detecting device according to the second embodiment of the present invention.
FIG. 11 A specific explanatory graph of the windings in the rotation angle detecting device according to the second embodiment of the present invention.
Figures 12, 13:
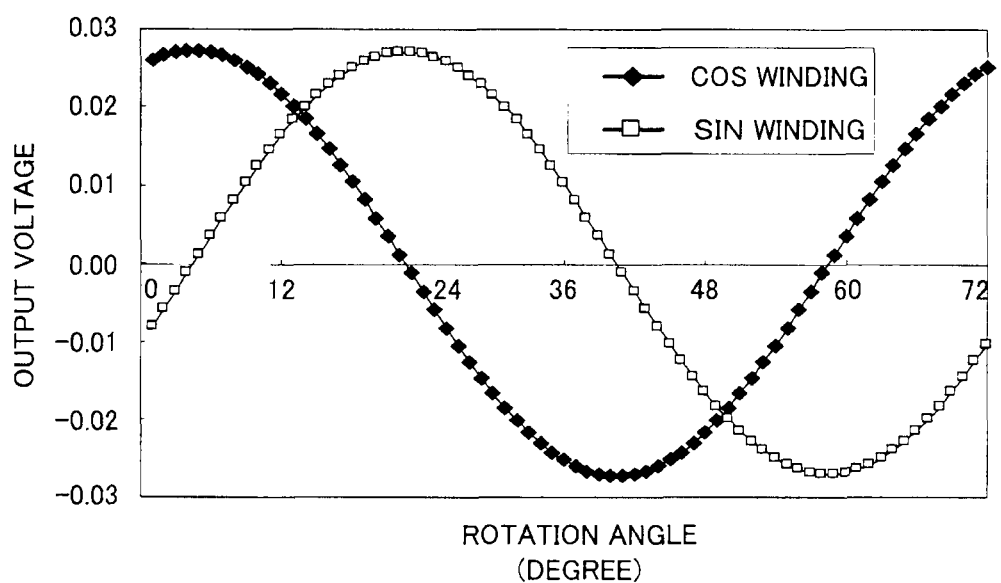
FIG. 12 Another specific example of the windings in the rotation angle detecting device according to the second embodiment of the present invention.
FIG. 13 An explanatory graph illustrating voltages of output windings in the rotation angle detecting device according to the second embodiment of the present invention.

When $N_{cos}(1)=N_{cos}(2)$ is solved, provided that $N_S=8$, $N_1=100$, $\theta_1=\theta_2=0$, $\eta_1=\eta_2=225°$, and as to the double sign, plus is used in Expression (10) while minus is used in Expression (11), $N_2/N_1=0.4142$. The numbers of turns in this case are as illustrated in FIG. 10. Further, the numbers of turns are illustrated in FIG. 11 with the axis of abscissa representing the tooth number and with the axis of ordinate representing the number of turns. Decimals may be accepted as the expression of the number of turns. In a case where the number of turns is expressed as a decimal, the winding is not wound around the tooth 3 by one turn but the winding operation therefor may instead be shifted midway to an adjacent tooth 3, for example. In the conventional example, the largest value of the number of turns is equal to $N_1$, that is, 100, but in the rotation angle detecting device according to the second embodiment of the present invention, the largest value of the number of turns of the output winding is 77, which reveals that the reduction of 23% is accomplished. FIG. 12 illustrates values obtained by rounding off the numbers of turns illustrated in FIG. 10. Also in such a case where the number of turns is expressed as an integer, needless to say, the device operates as the rotation angle detecting device. Further, there is produced an effect that the design is easy because the number of turns is expressed as an integer.

FIG. 13 is a plot of voltages of the output windings in the winding specification of the second embodiment of the present invention. The axis of abscissa represents a rotation angle as a mechanical angle and the axis of ordinate represents a peak value of the voltage. Plus and minus signs of the voltage represent a phase difference. For both the COS winding and the SIN winding, there is obtained a sine wave having a mechanical angle of 72° set as one period. Further, the phase shift is 18°. 18 multiplied by the shaft angle multiplier of 5 equals 90°. In other words, the phase difference between the COS winding and the SIN winding is an electrical angle of 90°. This means that the device functions as a rotation angle detecting device in which the shaft angle multiplier is 5. The waveforms illustrated in FIG. 13 are sinusoidal waveforms which hardly contain higher harmonics, and hence the highly accurate rotation angle detecting device can be obtained according to the present invention.

In the rotation angle detecting device of the conventional example, when the shaft angle multiplier is 5, the number of the teeth 3 is 20. In contrast, in the rotation angle detecting device according to the second embodiment of the present invention, the number of the teeth 3 is 8, which is much smaller than 20. In other words, the rotation angle detecting device is structured with a smaller number of the teeth 3 than in the conventional example even if the shaft angle multiplier increases, which produces an effect that the structure is excellent in winding workability and suitable for mass production.

Third Embodiment

Figure 14:
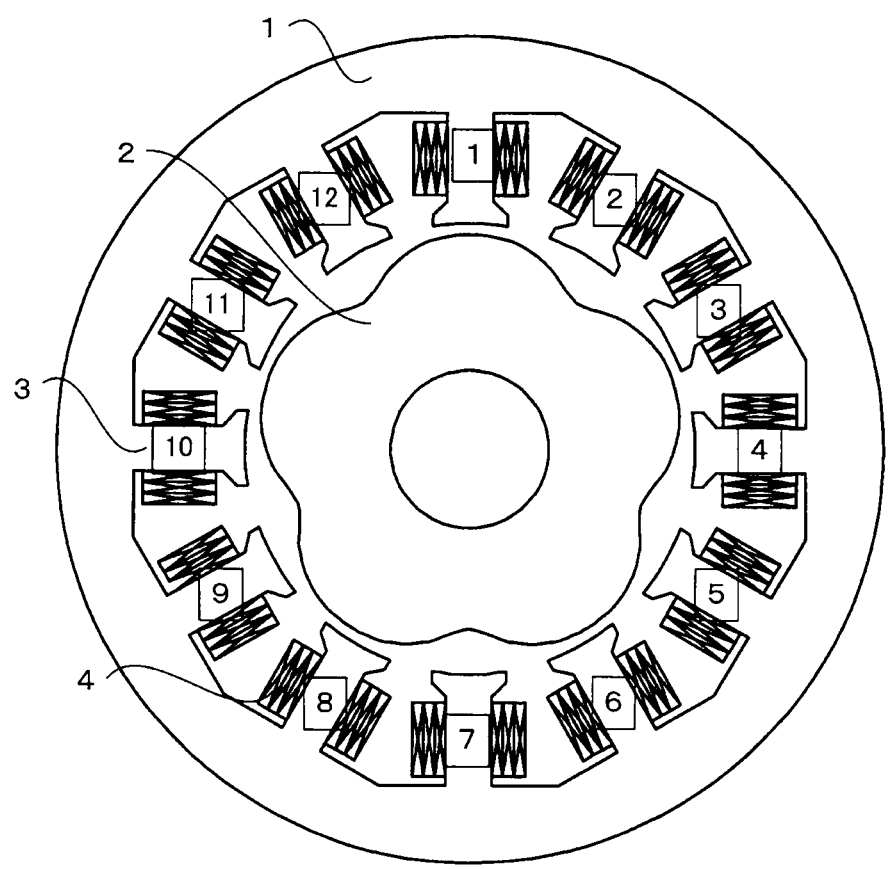
FIG. 14 A structural view illustrating a structure of a rotation angle detecting device according to a third embodiment of the present invention.

FIG. 14 is a structural view illustrating a structure of a rotation angle detecting device according to a third embodiment of the present invention.

The rotation angle detecting device according to the third embodiment of the present invention includes a stator 1 provided with teeth 3 and windings 4 wound around the teeth 3, and a rotor 2 with salient poles. For simple illustration, FIG. 14 only illustrates main parts of the rotation angle detecting device and omits details thereof such as an insulating member between the winding 4 and the tooth 3 and a connecting wire and a connection of the winding 4. The rotation angle detecting device according to the third embodiment of the present invention is an example in which the number of teeth is 12 and a shaft angle multiplier is 5 (the number of salient poles of the rotor 2 is 5). Numerals placed on the tooth portions are tooth numbers of the teeth 3 given for convenience.

Figures 15, 16:
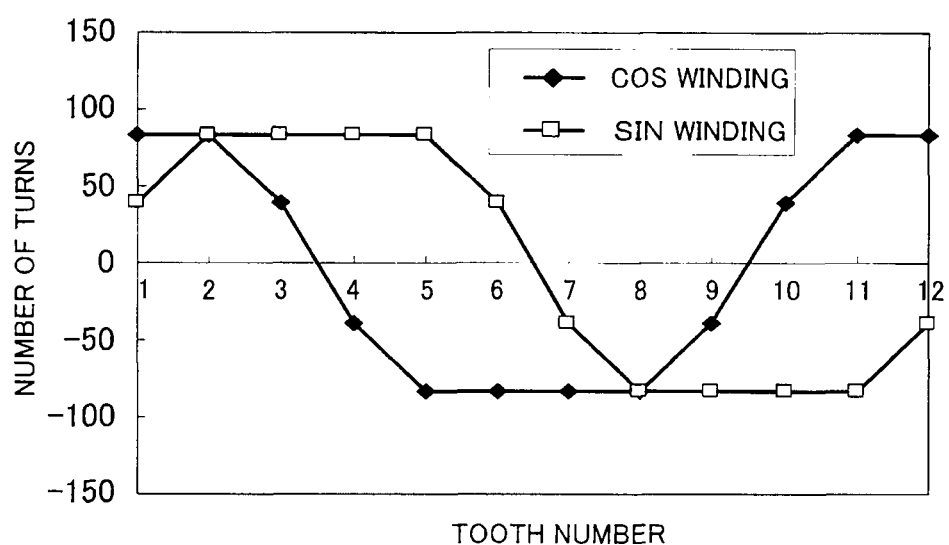
FIG. 15 A specific example of windings in the rotation angle detecting device according to the third embodiment of the present invention.
FIG. 16 A specific explanatory graph of the windings in the rotation angle detecting device according to the third embodiment of the present invention.
Figures 17, 18:
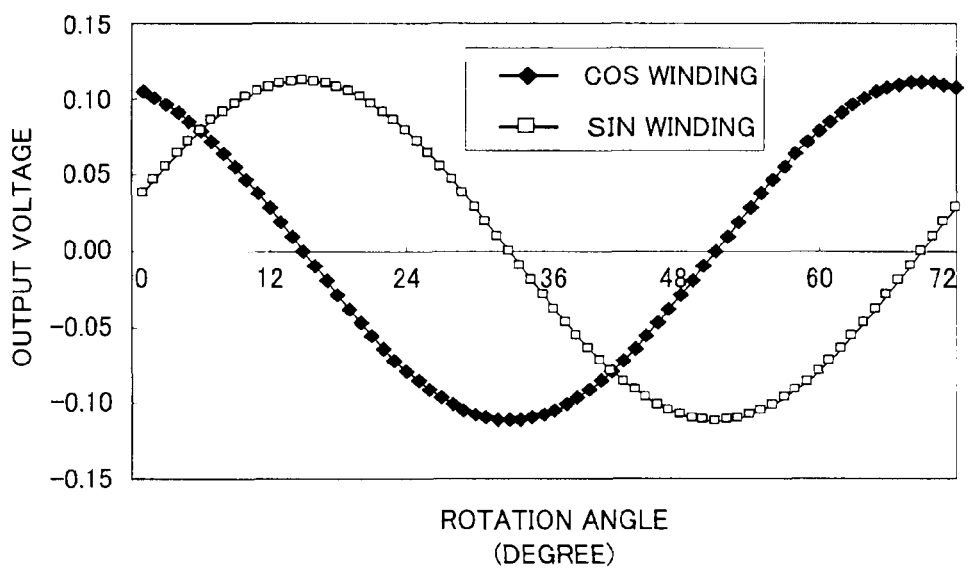
FIG. 17 Another specific example of the windings in the rotation angle detecting device according to the third embodiment of the present invention.
FIG. 18 An explanatory graph illustrating voltages of output windings in the rotation angle detecting device according to the third embodiment of the present invention.

An operation principle of the device as the rotation angle detecting device is the same as that in the first embodiment. A number N of pole pairs of the excitation is 6 and a number M of salient poles of the rotor is 5 in this embodiment. Therefore, a value |(number of pole pairs of excitation)±(shaft angle multiplier)|, that is, a value |N±M| is 1 or 11, and hence, from among the magnetic fluxes generated in the gap, a component of a 1st spatial order or an 11th spatial order is captured in the output windings. At this time, there is added a component of an order that allows the largest value of the number of turns to be made smaller than in the conventional case where the number of turns of the winding with respect to the mechanical angle is varied depending on the sine wave. In this embodiment, a case where a component of the 1st spatial order is captured is considered. An order L of the component to be added is set to 3. At this time, similarly to the second embodiment, the numbers of turns are expressed in Expressions (10) and (11). $N_{cos}(1)=N_{cos}(2)$ is solved, provided that $N_S=12$, $N_1=100$, $\theta_1=\theta_2=0$, $\eta_1=\eta_2=210°$, and as to the double sign, plus is used in Expression (10) while minus is used in Expression (11), and $N_2/N_1$ is obtained. The numbers of turns in this case are as illustrated in FIG. 15. Further, the numbers of turns are illustrated in FIG. 16 with the axis of abscissa representing the tooth number and with the axis of ordinate representing the number of turns. Decimals may be accepted as the expression of the number of turns. In a case where the number of turns is expressed as a decimal, the winding 4 is not wound around the tooth 3 by one turn but the winding operation for the winding 4 may instead be shifted midway to an adjacent tooth 3, for example. In the conventional example, the largest value of the number of turns is equal to $N_1$, that is, 100, but in the rotation angle detecting device according to the third embodiment, the largest value of the number of turns of the output winding is 84, which reveals that the reduction of 16% is accomplished. FIG. 17 illustrates values obtained by rounding off the numbers of turns illustrated in FIG. 15. Also in such a case where the number of turns is expressed as an integer, needless to say, the device operates as the rotation angle detecting device. Further, there is produced an effect that the design is easy because the number of turns is expressed as an integer.

FIG. 18 is a plot of voltages of the output windings in the winding specification of the third embodiment of the present invention. The axis of abscissa represents a rotation angle as a mechanical angle and the axis of ordinate represents a peak value of the voltage. Plus and minus signs of the voltage represent a phase difference. For both the COS winding and the SIN winding, there is obtained a sine wave having a mechanical angle of 72° set as one period. Further, the phase shift is 18°. 18 multiplied by the shaft angle multiplier of 5 equals 90°. In other words, the phase difference between the COS winding and the SIN winding is an electrical angle of 90°. This means that the device functions as a rotation angle detecting device in which the shaft angle multiplier is 5. The waveforms of FIG. 18 are sinusoidal waveforms which hardly contain higher harmonics, and hence it is also revealed that there is produced an effect that the highly accurate rotation angle detecting device can be obtained according to the present invention. In the conventional example, when the shaft angle multiplier is 5 as in this embodiment, the number of teeth is 20. In contrast, the rotation angle detecting device according to the third embodiment of the present invention is realized with the number of the teeth 3 being 12, which is much smaller than 20. In other words, the rotation angle detecting device is realized with a smaller number of the teeth 3 than in the conventional example even if the shaft angle multiplier increases, which produces an effect that the structure is excellent in winding workability and suitable for mass production.

Fourth Embodiment

Figure 19:
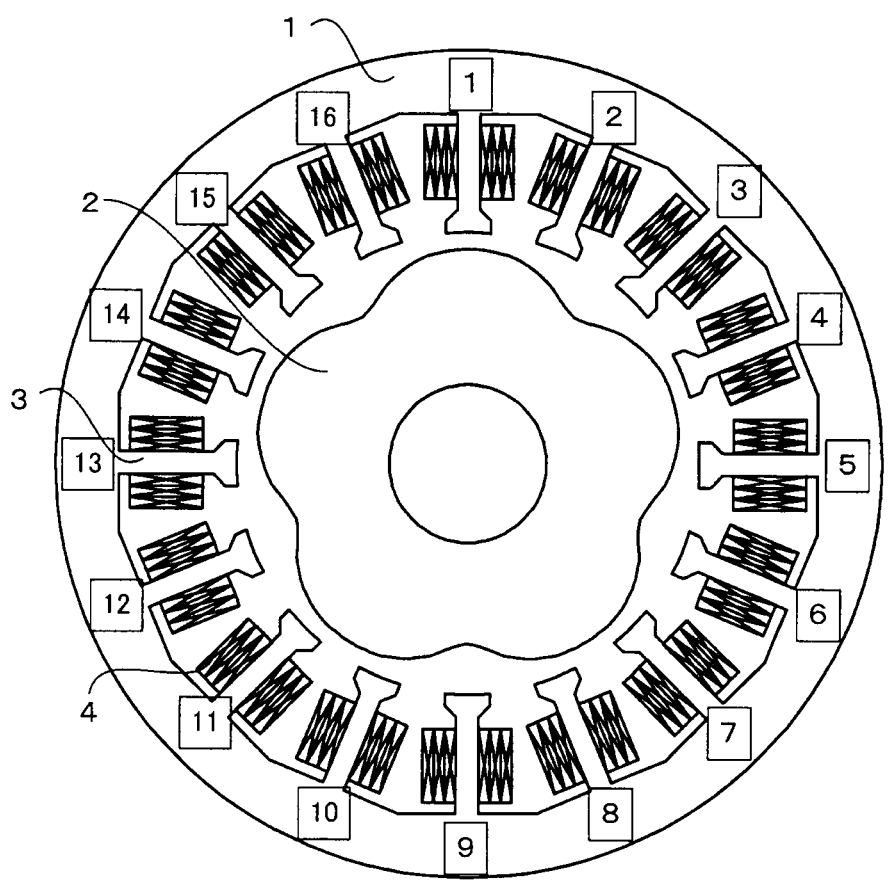
FIG. 19 A structural view illustrating a structure of a rotation angle detecting device according to a fourth embodiment of the present invention.

FIG. 19 is a structural view illustrating a structure of a rotation angle detecting device according to a fourth embodiment of the present invention.

The rotation angle detecting device according to the fourth embodiment of the present invention includes a stator 1 provided with teeth 3 and windings 4 wound around the teeth 3, and a rotor 2 with salient poles. For simple illustration, FIG. 19 only illustrates main parts of the rotation angle detecting device and omits details thereof such as an insulating member between the winding 4 and the tooth 3 and a connecting wire and a connection of the winding 4.

The rotation angle detecting device according to the fourth embodiment of the present invention is an example in which the number of the teeth 3 is 16 and a shaft angle multiplier is 5 (the number of salient poles of the rotor 2 is 5). Numerals placed on the tooth portions are tooth numbers of the teeth 3 given for convenience.

An operation principle of the device as the rotation angle detecting device is the same as that in the first embodiment.

A number N of pole pairs of the excitation is 4 and a number M of salient poles of the rotor is 5 in this embodiment. Therefore, a value |(number of pole pairs of excitation)± (shaft angle multiplier)|, that is, a value |N±M| is 1 or 9, and hence, from among the magnetic fluxes generated in the gap, a component of a 1st spatial order or a 9th spatial order is captured in the output windings. At this time, there is added a component of an order that allows the largest value of the number of turns to be made smaller than in the conventional case where the number of turns of the winding with respect to the mechanical angle is varied depending on the sine wave. In this embodiment, a case where a component of the 1st spatial order is captured is considered. An order L of the component to be added is set to 3. At this time, similarly to the second embodiment, the numbers of turns are expressed in Expressions (10) and (11).

Figures 20, 21:
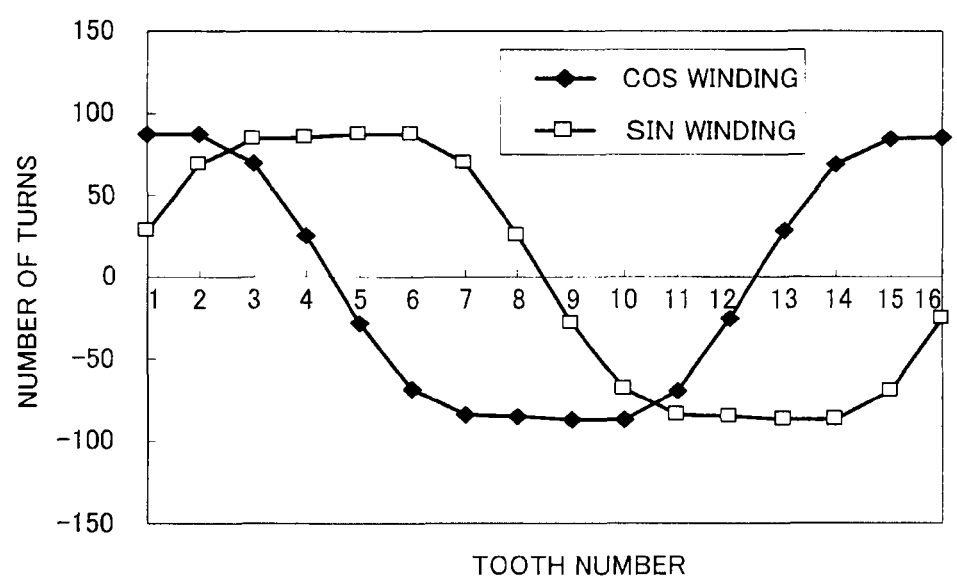
FIG. 20 A specific example of windings in the rotation angle detecting device according to the fourth embodiment of the present invention.
FIG. 21 A specific explanatory graph of the windings in the rotation angle detecting device according to the fourth embodiment of the present invention.
Figures 22, 23:
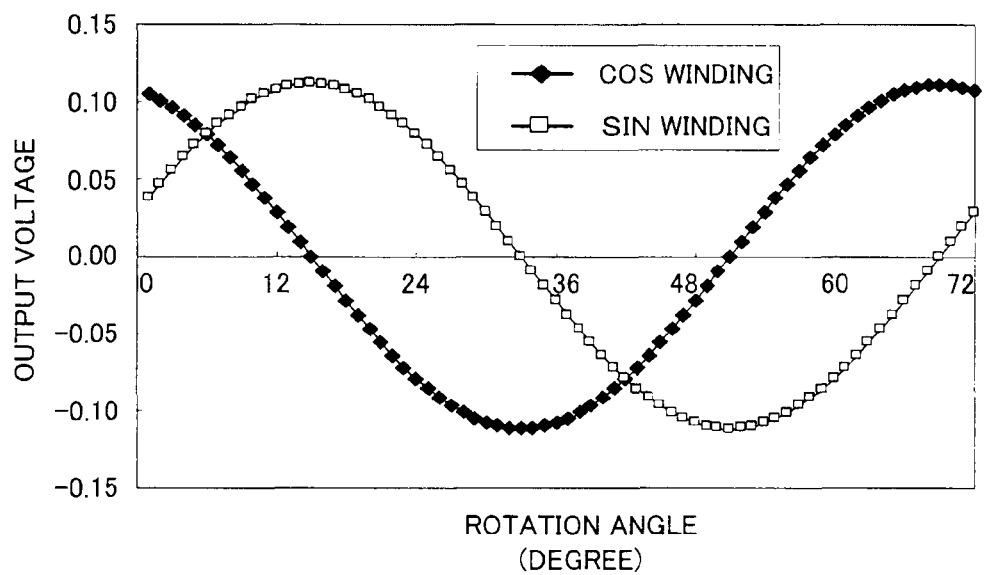
FIG. 22 Another specific example of the windings in the rotation angle detecting device according to the fourth embodiment of the present invention.
FIG. 23 An explanatory graph illustrating voltages of output windings in the rotation angle detecting device according to the fourth embodiment of the present invention.

$N_{cos}(1)=N_{cos}(2)$ is solved, provided that $N_S=16$, $N_1=100$, $\theta_1=\theta_2=0$, $\eta_1=\eta_2=210°$, and as to the double sign, plus is employed in Expression (10) while minus is employed in Expression (11), and $N_2/N_1$ is obtained. The numbers of turns in this case are as illustrated in FIG. 20. Further, the numbers of turns are illustrated in FIG. 21 with the axis of abscissa representing the tooth number and with the axis of ordinate representing the number of turns. Decimals may be accepted as the expression of the number of turns. In a case where the number of turns is expressed as a decimal, the winding 4 is not wound around the tooth 3 by one turn but the winding operation for the winding 4 may instead be shifted midway to an adjacent tooth 3, for example. In the conventional example, the largest value of the number of turns is equal to $N_1$, that is, 100, but in the rotation angle detecting device according to the fourth embodiment, the largest value of the number of turns of the output winding is about 88, which reveals that the reduction of 12% is accomplished. FIG. 22 illustrates values obtained by rounding off the numbers of turns illustrated in FIG. 20. Also in such a case where the number of turns is expressed as an integer, needless to say, the device operates as the rotation angle detecting device. Further, there is produced an effect that the design is easy because the number of turns is expressed as an integer.

FIG. 23 is a plot of voltages of the output windings in the winding specification of the fourth embodiment. In FIG. 23, the axis of abscissa represents a rotation angle as a mechanical angle and the axis of ordinate represents a peak value of the voltage. Plus and minus signs of the voltage represent a phase difference. For both the COS winding and the SIN winding, there is obtained a sine wave having a mechanical angle of 72° set as one period. Further, the phase shift is 18°. 18 multiplied by the shaft angle multiplier of 5 equals 90°. In other words, the phase difference between the COS winding and the SIN winding is an electrical angle of 90°. This means that the device functions as a rotation angle detecting device in which the shaft angle multiplier is 5. The waveforms of FIG. 23 are sinusoidal waveforms which hardly contain higher harmonics, and hence it is also revealed that there is produced an effect that the highly accurate rotation angle detecting device can be obtained according to the present invention. In the conventional example, when the shaft angle multiplier is 5 as in this embodiment, the number of the teeth 3 is 20. In contrast, the rotation angle detecting device according to the fourth embodiment of the present invention is realized with the number of the teeth 3 being 16, which is smaller than 20. In other words, the rotation angle detecting device is realized with a smaller number of the teeth 3 than in the conventional example even if the shaft angle multiplier increases, which produces an effect that the structure is excellent in winding workability and suitable for mass production.

Fifth Embodiment

Figure 24:
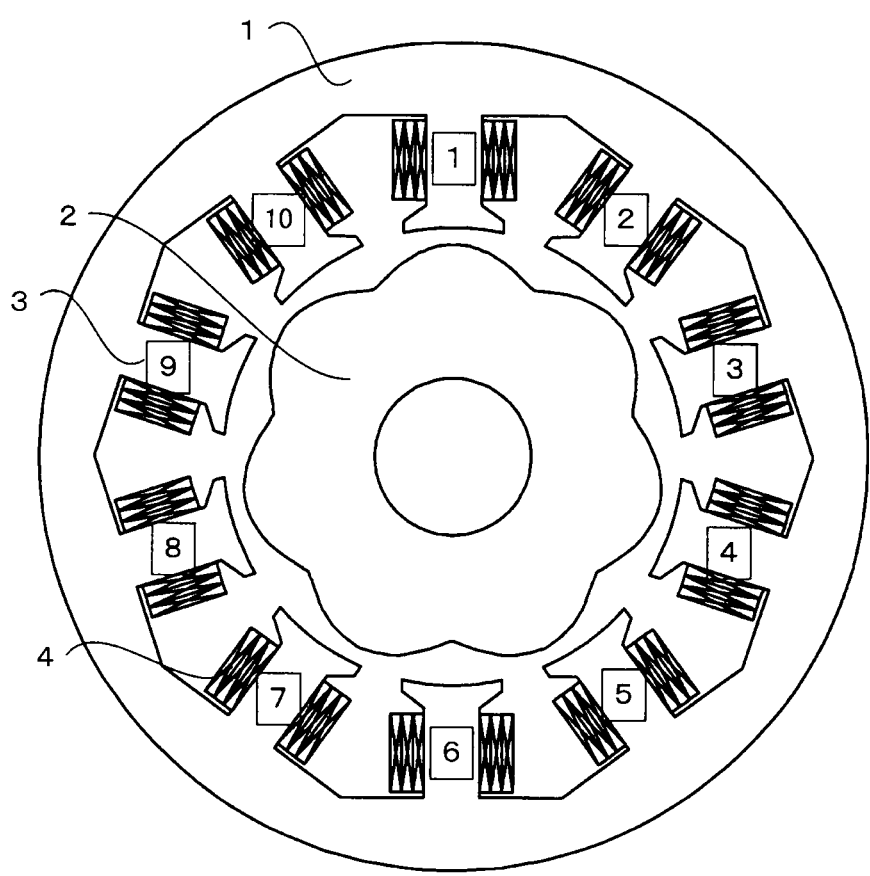
FIG. 24 A structural view illustrating a structure of a rotation angle detecting device according to a fifth embodiment of the present invention.

FIG. 24 is a structural view illustrating a structure of a rotation angle detecting device according to a fifth embodiment of the present invention.

The rotation angle detecting device according to the fifth embodiment of the present invention includes a stator 1 provided with teeth 3 and windings 4 wound around the teeth 3, and a rotor 2 with salient poles. For simple illustration, FIG. 24 only illustrates main parts of the rotation angle detecting device and omits details thereof such as an insulating member between the winding 4 and the tooth 3 and a connecting wire and a connection of the winding 4.

The rotation angle detecting device according to the fifth embodiment of the present invention is an example in which the number of the teeth 3 is 10 and a shaft angle multiplier is 7 (the number of salient poles of the rotor 2 is 7). Numerals placed on the tooth portions are tooth numbers of the teeth 3 given for convenience.

An operation principle of the device as the rotation angle detecting device is the same as that in the first embodiment.

A number N of pole pairs of the excitation is 5 and a number M of salient poles of the rotor 2 is 7 in this embodiment. Therefore, a value |(number of pole pairs of excitation) ±(shaft angle multiplier)|, that is, a value |N±M| is 2 or 12, and hence, from among the magnetic fluxes generated in the gap, a component of a 2nd spatial order or a 12th spatial order only needs to be captured in the output windings. Further, there only needs to be added a component of an order that allows the largest value of the number of turns to be made smaller than in the conventional case where the number of turns is varied depending on the sine wave. In this embodiment, a case where a component of the 2nd spatial order is captured is considered. An order L of the component to be added is set to 6, which is different from those in the above-mentioned embodiments. At this time, the numbers of turns are expressed in Expressions (12) and (13).

[Expression 7]

$$N_{cos}(i) = \quad (12)$$
$$N_1 \cos\left(2 \times \frac{2\pi(i-1)}{N_s} + \frac{\pi}{N_s} + \theta_1\right) \pm N_2 \cos\left(6 \times \frac{2\pi(i-1)}{N_s} + \frac{\pi}{N_s} + \eta_1\right)$$

$$N_{sin}(i) = \quad (13)$$
$$N_1 \sin\left(2 \times \frac{2\pi(i-1)}{N_s} + \frac{\pi}{N_s} + \theta_2\right) \pm N_2 \sin\left(6 \times \frac{2\pi(i-1)}{N_s} + \frac{\pi}{N_s} + \eta_2\right)$$

Figures 25, 26:
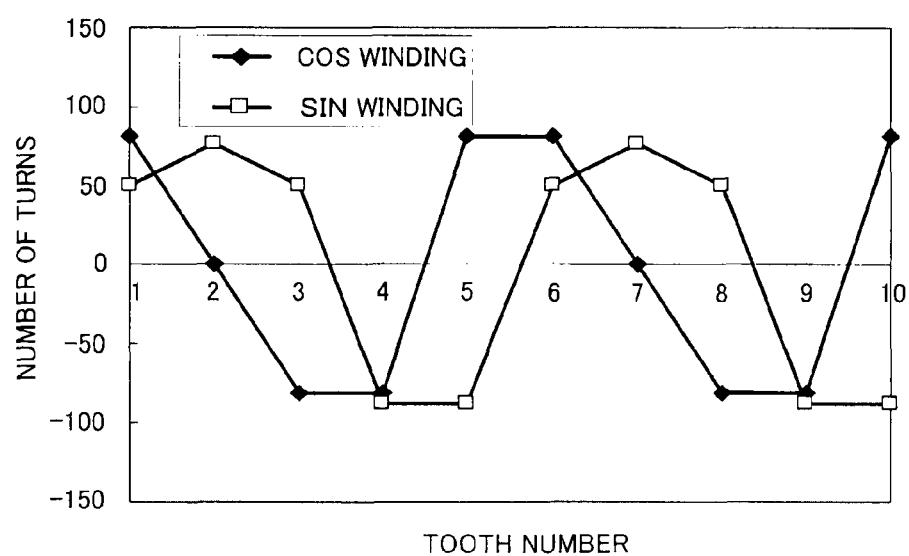
FIG. 25 A specific example of windings in the rotation angle detecting device according to the fifth embodiment of the present invention.
FIG. 26 A specific explanatory graph of the windings in the rotation angle detecting device according to the fifth embodiment of the present invention.
Figures 27, 28:
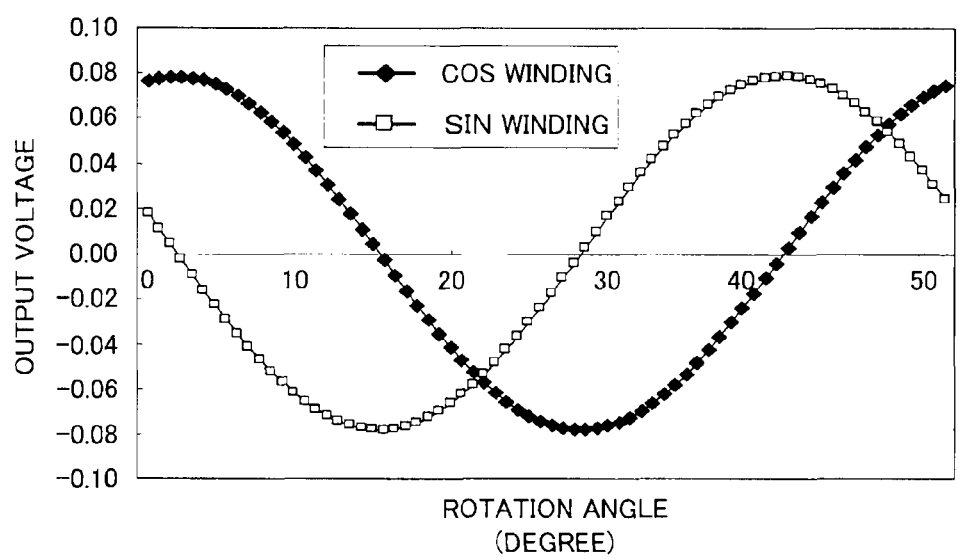
FIG. 27 Another specific example of the windings in the rotation angle detecting device according to the fifth embodiment of the present invention.
FIG. 28 An explanatory graph illustrating voltages of output windings in the rotation angle detecting device according to the fifth embodiment of the present invention.

$N_{cos}(3) = N_{cos}(4)$ is solved, provided that $N_s=10$, $N_1=100$, $\theta_1=\theta_2=0$, $\eta_1=\eta_2=216°$, and as to the double sign, plus is used in Expression (12) while minus is used in Expression (13), and $N_2/N_1$ is obtained. The numbers of turns in this case are as illustrated in FIG. 25. Further, the numbers of turns are illustrated in FIG. 26 with the axis of abscissa representing the tooth number and with the axis of ordinate representing the number of turns. Decimals may be accepted as the expression of the number of turns. In a case where the number of turns is expressed as a decimal, the winding 4 is not wound around the tooth 3 by one turn but the winding operation for the winding 4 may instead be shifted midway to an adjacent tooth 3, for example. In the conventional example, the largest value of the number of turns is equal to N1, that is, 100, but in the rotation angle detecting device according to the fifth embodiment, the largest value of the number of turns of the output winding is 88, which reveals that the reduction of 12% is accomplished. FIG. 27 illustrates values obtained by rounding off the numbers of turns illustrated in FIG. 25. Also in such a case where the number of turns is expressed as an integer, needless to say, the device operates as the rotation angle detecting device. Further, there is produced an effect that the design is easy because the number of turns is expressed as an integer.

According to the numbers of turns of the windings 4 illustrated in FIGS. 25 to 27, the numbers of turns of the COS windings are zero in the tooth numbers of 2 and 7. When there is such a tooth 3 in which the number of turns is zero, needless to say, an effect of enhancing the efficiency of the winding work is obtained because the tooth 3 does not need any winding operation of the winding 4 by the winding machine.

FIG. 28 is a plot of voltages of the output windings in the winding specification of the fifth embodiment. The axis of abscissa represents a rotation angle as a mechanical angle and the axis of ordinate represents a peak value of the voltage. Plus and minus signs of the voltage represent a phase difference. For both the COS winding and the SIN winding, there is obtained a sine wave having a mechanical angle of $360°/7 \approx 51.4°$ set as one period. Further, the phase shift is $360°/28=12.6°$. In other words, the phase difference between the COS winding and the SIN winding is an electrical angle of 90°. This means that the device functions as a rotation angle detecting device in which the shaft angle multiplier is 7. The waveforms of FIG. 28 are sinusoidal waveforms which hardly contain higher harmonics, and hence it is also revealed that there is produced an effect that the highly accurate rotation angle detecting device can be obtained according to the present invention. In the conventional example having the same structure as in this embodiment in which the shaft angle multiplier is 7, the number of the teeth 3 is 28. In contrast, the rotation angle detecting device according to the fifth embodiment of the present invention is realized with the number of the teeth 3 being 10, which is much smaller than 28. In other words, the rotation angle detecting device is realized with a smaller number of the teeth 3 than in the conventional example even if the shaft angle multiplier increases, which produces an effect that the structure is excellent in winding workability and suitable for mass production.

Sixth Embodiment

Figure 29:
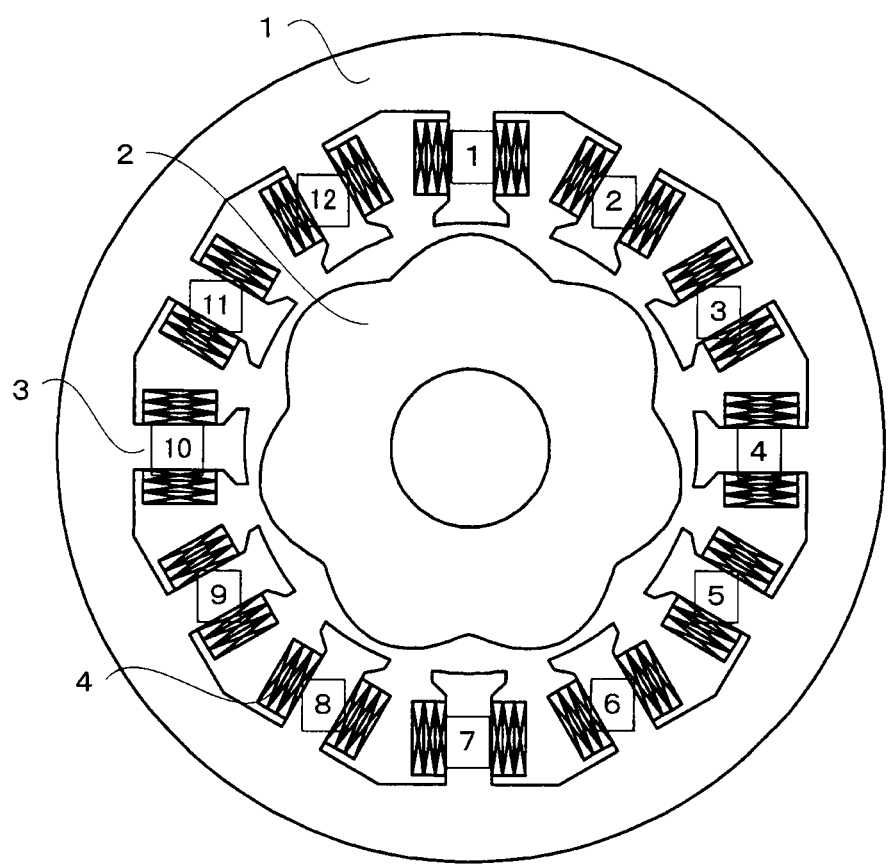
FIG. 29 A structural view illustrating a structure of a rotation angle detecting device according to a sixth embodiment of the present invention.

FIG. 29 is a structural view illustrating a structure of a rotation angle detecting device according to a sixth embodiment of the present invention.

The rotation angle detecting device according to the sixth embodiment of the present invention includes a stator 1 provided with teeth 3 and windings 4 wound around the teeth 3, and a rotor 2 with salient poles. For simple illustration, FIG. 29 only illustrates main parts of the rotation angle detecting device and omits details thereof such as an insulating member between the winding 4 and the tooth 3 and a connecting wire and a connection of the winding 4.

The rotation angle detecting device according to the sixth embodiment of the present invention is an example in which the number of the teeth 3 is 12 and a shaft angle multiplier is 7 (the number of salient poles of the rotor 2 is 7). Numerals placed on the tooth portions are tooth numbers of the teeth 3 given for convenience.

An operation principle of the device as the rotation angle detecting device is the same as that in the first embodiment.

A number N of pole pairs of the excitation is 6 and a number M of salient poles of the rotor is 7 in this embodiment.

Therefore, a value |(number of pole pairs of excitation)±(shaft angle multiplier)|, that is, a value |N±M| is 1 or 13, and hence, from among the magnetic fluxes generated in the gap, a component of a 1st spatial order or a 13th spatial order only needs to be captured in the output windings.

Further, there only needs to be added a component of an order that allows the largest value of the number of turns to be made smaller than in the conventional case where the number of turns is varied depending on the sine wave. In this embodiment, a case where a component of the 1st spatial order is captured is considered. An order L of the component to be added is set to 3.

Figures 30, 31:
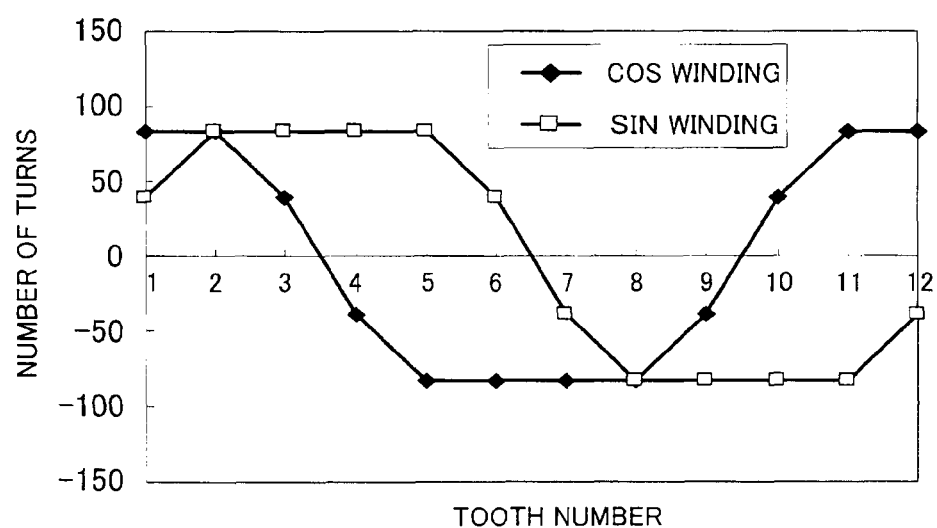
FIG. 30 A specific example of windings in the rotation angle detecting device according to the sixth embodiment of the present invention.
FIG. 31 A specific explanatory graph of the windings in the rotation angle detecting device according to the sixth embodiment of the present invention.

At this time, similarly to the second embodiment, the numbers of turns are expressed in Expressions (10) and (11). $N_{cos}(1)=N_{cos}(2)$ is solved, provided that $N_S=12$, $N_1=100$, $\theta_1=\theta_2=0$, $\eta_1=\eta_2=210°$, and as to the double sign, plus is used in Expression (10) while minus is used in Expression (11), and $N_2/N_1$ is obtained. The numbers of turns in this case are as illustrated in FIG. 30. Further, the numbers of turns are illustrated in FIG. 31 with the axis of abscissa representing the tooth number and with the axis of ordinate representing the number of turns. Decimals may be accepted as the expression of the number of turns. In a case where the number of turns is expressed as a decimal, the winding 4 is not wound around the tooth 3 by one turn but the winding operation for the winding 4 may instead be shifted midway to an adjacent tooth 3, for example.

In the conventional example, the largest value of the number of turns is equal to $N_1$, that is, 100, but in the rotation angle detecting device according to the sixth embodiment of the present invention, the largest value of the number of turns of the output winding is 84, which reveals that the reduction of 16% is accomplished.

Figures 32, 33:
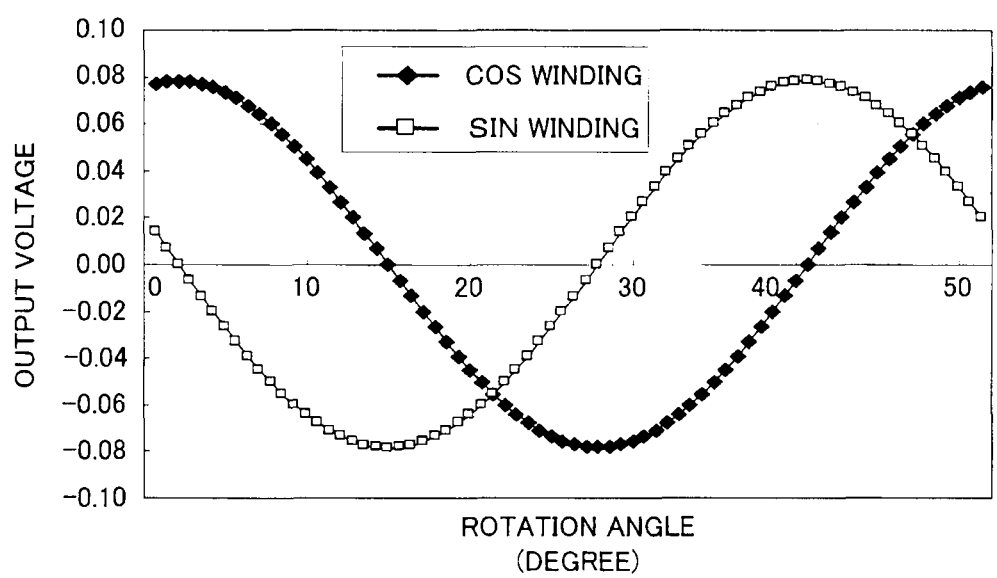
FIG. 32 Another specific example of the windings in the rotation angle detecting device according to the sixth embodiment of the present invention.
FIG. 33 An explanatory graph illustrating voltages of output windings in the rotation angle detecting device according to the sixth embodiment of the present invention.

FIG. 32 illustrates values obtained by rounding off the numbers of turns illustrated in FIG. 30. Also in such a case where the number of turns is expressed as an integer, needless to say, the device operates as the rotation angle detecting device. Further, there is produced an effect that the design is easy because the number of turns is expressed as an integer.

FIG. 33 is a plot of voltages of the output windings in the winding specification of the sixth embodiment. The axis of abscissa represents a rotation angle as a mechanical angle. The axis of ordinate represents a peak value of the voltage. Similarly to the fifth embodiment, this figure shows that the device functions as a rotation angle detecting device in which the shaft angle multiplier is 7. The waveforms of FIG. 33 are sinusoidal waveforms which hardly contain higher harmonics, and hence it is also revealed that there is produced an effect that the highly accurate rotation angle detecting device can be obtained according to the present invention.

In the conventional example having the same structure as in this embodiment in which the shaft angle multiplier is 7, the number of the teeth 3 is 28. In contrast, the rotation angle detecting device according to the sixth embodiment of the present invention is realized with the number of the teeth 3 being 12, which is much smaller than 28. In other words, the rotation angle detecting device is realized with a smaller number of the teeth 3 than in the conventional example even if the shaft angle multiplier increases, which produces an effect that the structure is excellent in winding workability and suitable for mass production.

Seventh Embodiment

Figure 34:
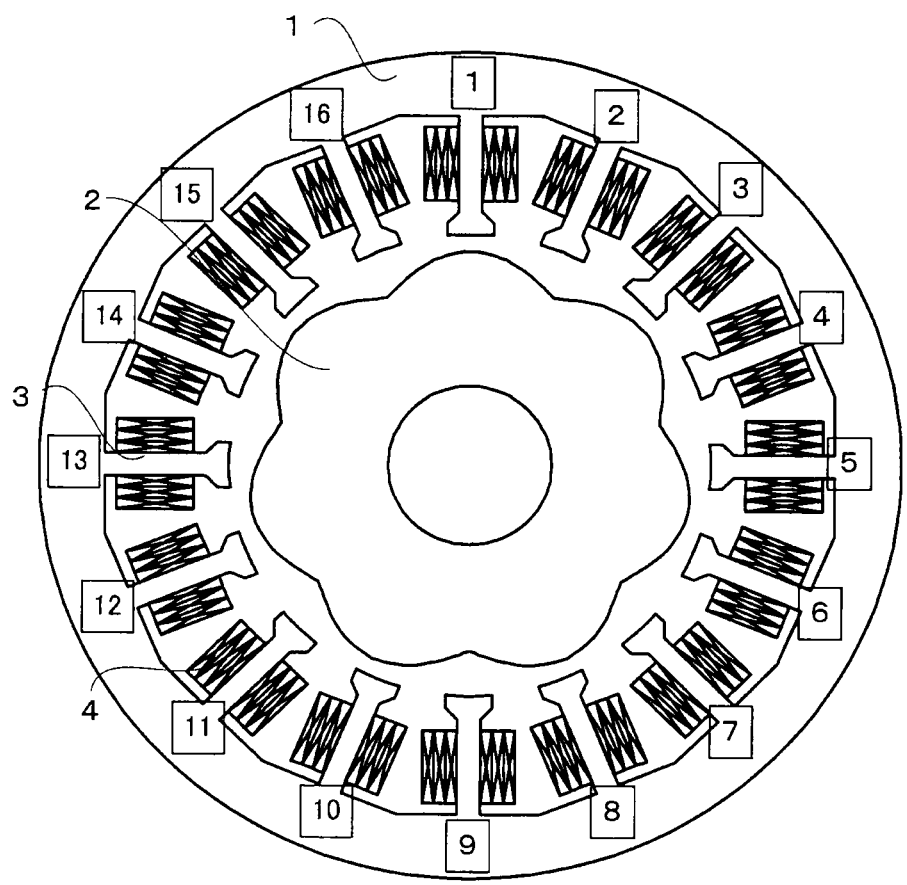
FIG. 34 A structural view illustrating a structure of a rotation angle detecting device according to a seventh embodiment of the present invention.

FIG. 34 is a structural view illustrating a structure of a rotation angle detecting device according to a seventh embodiment of the present invention.

The rotation angle detecting device according to the seventh embodiment of the present invention includes a stator 1 provided with teeth 3 and windings 4 wound around the teeth 3, and a rotor 2 with salient poles. For simple illustration, FIG. 34 only illustrates main parts of the rotation angle detecting device and omits details thereof such as an insulating member between the winding 4 and the tooth 3 and a connecting wire and a connection of the winding 4.

The rotation angle detecting device according to the seventh embodiment of the present invention is an example in which the number of the teeth 3 is 16 and a shaft angle multiplier is 7 (the number of salient poles of the rotor 2 is 7). Numerals placed on the tooth portions are tooth numbers of the teeth 3 given for convenience.

An operation principle of the device as the rotation angle detecting device is the same as that in the first embodiment.

A number N of pole pairs of the excitation is 8 and a number M of salient poles of the rotor 2 is 7 in this embodiment. Therefore, a value |(number of pole pairs of excitation)±(shaft angle multiplier)|, that is, a value |N±M| is 1 or 15, and hence, from among the magnetic fluxes generated in the gap, a component of a 1st spatial order or a 15th spatial order only needs to be captured in the output windings. Further, there only needs to be added a component of an order that allows the largest value of the number of turns to be made smaller than in the conventional case where the number of turns is varied sinusoidally. In this embodiment, a case where a component of the 1st spatial order is captured is considered. An order L of the component to be added is set to 3.

Figures 35, 36:
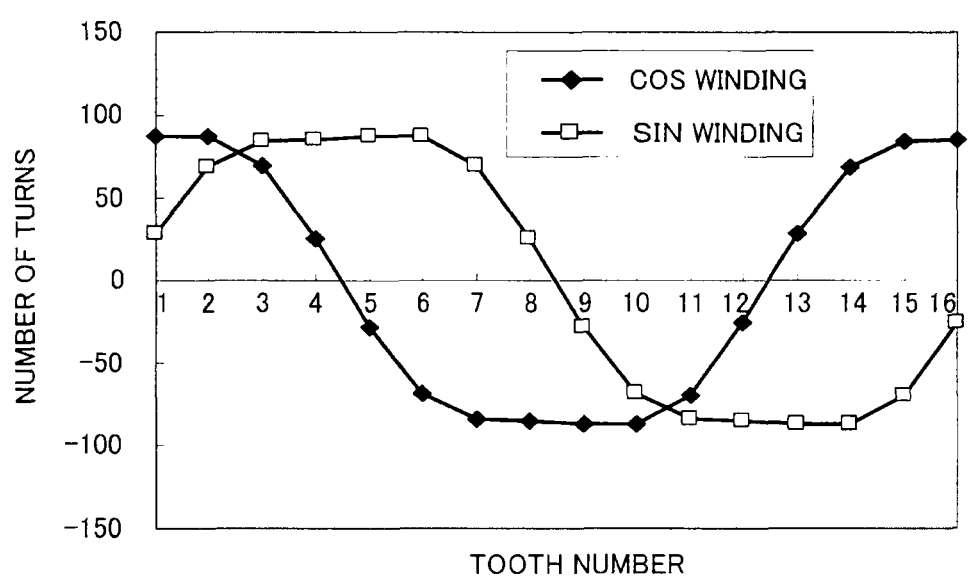
FIG. 35 A specific example of windings in the rotation angle detecting device according to the seventh embodiment of the present invention.
FIG. 36 A specific explanatory graph of the windings in the rotation angle detecting device according to the seventh embodiment of the present invention.

At this time, similarly to the second embodiment, the numbers of turns are expressed in Expressions (10) and (11). $N_2/N_1$ is obtained when $N_{cos}(1)=N_{cos}(2)$ is established, provided that $N_S=12$, $N_1=100$, $\theta_1=\theta_2=0$, $\eta_1=\eta_2=210°$, and as to the double sign, plus is used in Expression (10) while minus is used in Expression (11). The numbers of turns in this case are as illustrated in FIG. 35. Further, the numbers of turns are illustrated in FIG. 36 with the axis of abscissa representing the tooth number and with the axis of ordinate representing the number of turns. Decimals may be accepted as the expression of the number of turns. In a case where the number of turns is expressed as a decimal, the winding 4 is not wound around the tooth 3 by one turn but the winding operation for the winding 4 may instead be shifted midway to an adjacent tooth 3, for example. In the conventional example, the largest value of the number of turns is equal to $N_1$, that is, 100, but in the rotation angle detecting device according to the seventh embodiment of the present invention, the largest value of the number of turns of the output winding is 88, which reveals that the reduction of 12% is accomplished.

Figures 37, 38:
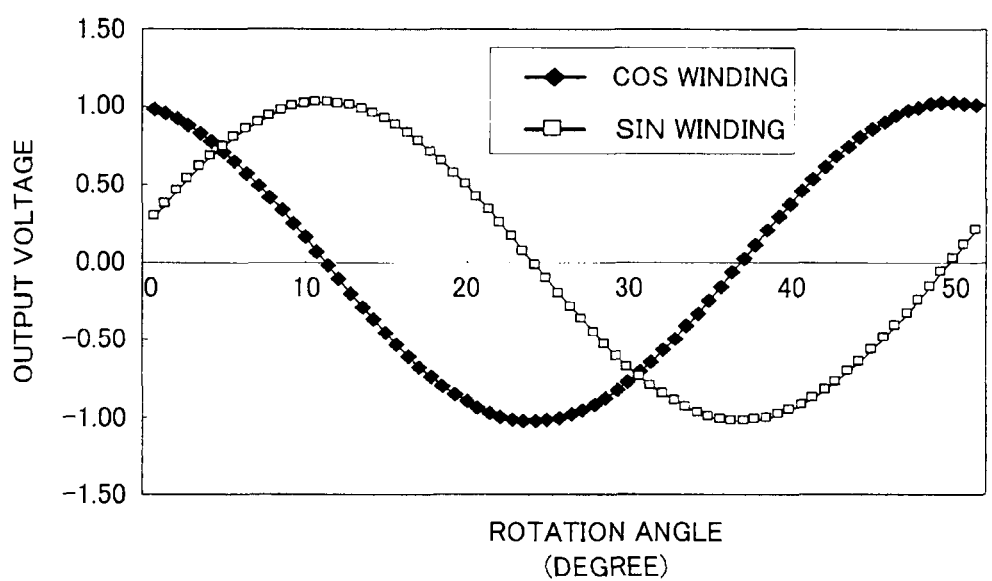
FIG. 37 Another specific example of the windings in the rotation angle detecting device according to the seventh embodiment of the present invention.
FIG. 38 An explanatory graph illustrating voltages of output windings in the rotation angle detecting device according to the seventh embodiment of the present invention.

FIG. 37 illustrates values obtained by rounding off the numbers of turns illustrated in FIG. 35. Also in such a case where the number of turns is expressed as an integer, needless to say, the device operates as the rotation angle detecting device. Further, there is produced an effect that the design is easy because the number of turns is expressed as an integer.

FIG. 38 is a plot of voltages of the output windings in the winding specification of the seventh embodiment of the present invention. In FIG. 38, the axis of abscissa represents a rotation angle as a mechanical angle and the axis of ordinate represents a peak value of the voltage. Similarly to the sixth embodiment, this figure shows that the device functions as a rotation angle detecting device in which the shaft angle multiplier is 7. The waveforms of FIG. 38 are sinusoidal waveforms which hardly contain higher harmonics, and hence it is also revealed that there is produced an effect that the highly accurate rotation angle detecting device can be obtained according to the present invention.

Further, in the conventional example having the same structure as in this embodiment in which the shaft angle multiplier is 7, the number of the teeth 3 is 28. In contrast, the rotation angle detecting device according to the seventh embodiment of the present invention is realized with the number of the teeth 3 being 16, which is much smaller than 28. In other words, the rotation angle detecting device is realized with a smaller number of the teeth 3 than in the conventional example even if the shaft angle multiplier increases, which produces an effect that the structure is excellent in winding workability and suitable for mass production.

Note that, the number of turns of the exciting winding is 50 in each of the teeth 3 in the above-mentioned first to seventh embodiments, but the present invention is not limited thereto, and the number of turns of the exciting winding may be set appropriately as necessary, depending on electric characteristics such as input impedance.

Further, the parameters $N_1$ and $N_2$ may be set appropriately depending on a transformation ratio or the like.

Further, the description has been given only of the rotation angle detecting device in which the shaft angle multiplier is 4, 5, or 7, but the present invention is not limited thereto, and a rotation angle detecting device in which the shaft angle multiplier is 1, 2, 3, 6, 8, or more may be structured with the same idea.

Eighth Embodiment

Figure 39:
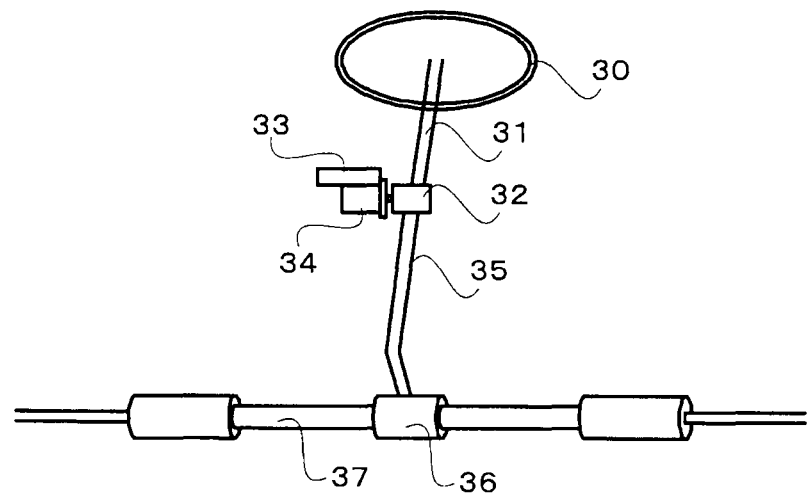
FIG. 39 An explanatory view of a structure of an electric power steering device according to an eighth embodiment of the present invention.

FIG. 39 is a conceptual view of an electric power steering device for a vehicle having the rotation angle detecting device according to the present invention mounted thereon.

Description is first given of the electric power steering device for a vehicle.

The electric power steering device for a vehicle includes a steering column shaft 31 for transmitting a steering force from a steering wheel 30. A worm gear 32 (details thereof are omitted in FIG. 41, and only a gearbox is illustrated) is connected to the steering column shaft 31, which transmits an output (torque and rpm) of a motor 34 driven by a controller 33 while changing a direction of rotation by 90 degrees and decelerating the rotation, to thereby increase assist torque. A handle joint 35 is connected to the worm gear 32, through which the steering force is transmitted while the direction thereof is changed. A steering gear (details thereof are omitted in FIG. 41, and only a gearbox is illustrated) 36 is connected to the handle joint 35, which decelerates the rotation of the steering column shaft 31 and converts the rotation into linear motion of a rack 37, to thereby obtain a required displacement. By the linear motion of the rack 37, wheels are moved to allow a vehicle to change in direction or other such operation.

In the electric power steering device as described above, torque pulsation occurring in the motor 34 is transmitted to the steering wheel 30 through an intermediation of the worm gear 32 and the steering column shaft 31. Therefore, when a large torque pulsation occurs in the motor 34, any smooth steering feel cannot be obtained. Further, even when the motor is in a state in which assist torque is not generated, if the motor generates a large cogging torque, any smooth steering feel cannot be obtained.

Further, in a case where the motor 34 is a brushless motor, means for detecting a rotation angle of a rotor is necessary.

Figure 40:
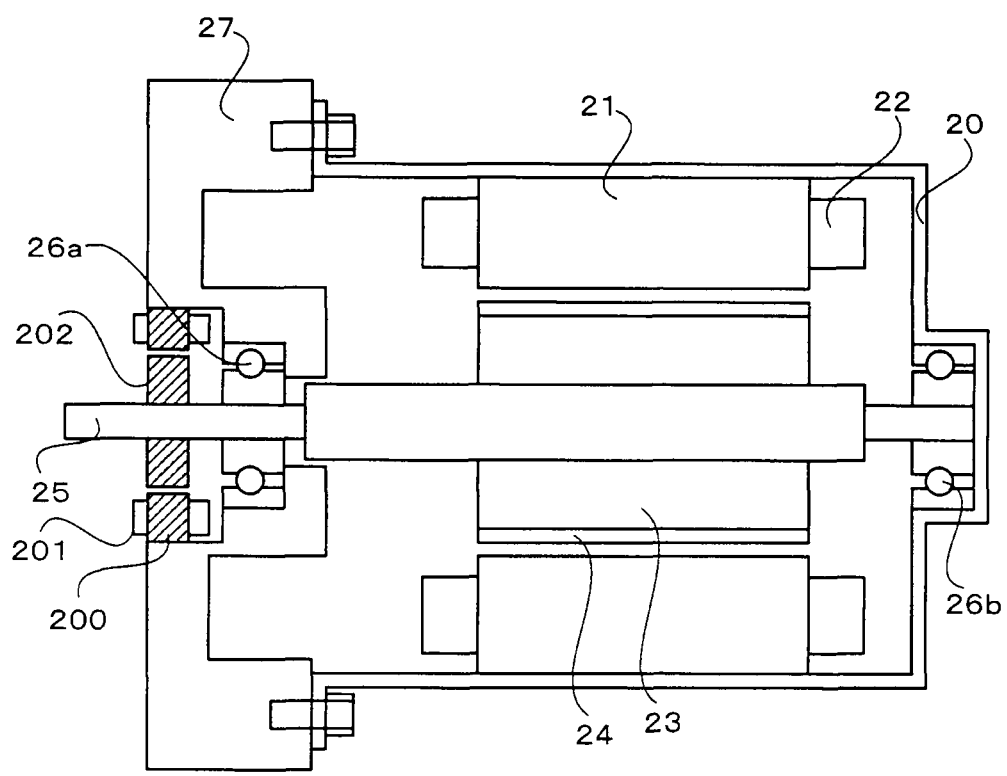
FIG. 40 An explanatory view of a structure of a dynamo-electric machine according to the eighth embodiment of the present invention.

FIG. 40 is a structural view illustrating as an example a structure of the brushless motor. For simple illustration, FIG. 40 only illustrates main components thereof.

A stator core 21 is fixed to a frame 20 through press-fitting, through shrink-fitting, or with an adhesive. An armature winding 22 is wound around the stator core 21, and when current is supplied to the armature winding 22, torque is generated. A rotor includes a rotor core 23 and a permanent magnet 24. A shaft 25 is press-fitted into the rotor core 23 and supported by bearings 26a and 26b so as to freely rotate. The shaft 25 may be formed of a different material from that of the rotor core 23, or may be formed of the same material as that of the rotor core 23. The frame 20 is fixed to a housing 27. A stator 200 of the rotation angle detecting device is fixed to the housing 27, and a winding 201 is wound around the stator 200. A rotor 202 is fixed to the shaft 25 through press-fitting or other such method.

Based on an angle of the rotor 202 detected by the rotation angle detecting device, current is supplied to the armature winding 22 of the motor. When the detection accuracy of the angle is low, the phase is shifted and accordingly the torque pulsation occurs, resulting in a poor steering feel.

Further, it is desired from the mounting point of view that the rotation angle detecting device be smaller than the motor. For example, it is desired that an outside diameter thereof be half an outside diameter of the motor or smaller as illustrated in FIG. 40. When the outside diameter becomes smaller, obviously, an inside diameter of the stator 200 of the rotation angle detecting device also becomes smaller. When the number of teeth 3 of the rotation angle detecting device increases, intervals between the teeth 3 become narrower, with the result that the slots for receiving windings 4 become narrower. The nozzle of the winding machine is hard to insert, and hence the structure is lower in winding workability and is not suitable for mass production. When the outside diameter (diameter) of the motor is 80 mm, for example, the outside diameter (diameter) of the rotation angle detecting device is 40 mm, and the inside diameter of the stator 200 is about 20 mm being a further halved value. Therefore, when the number of the teeth 3 is 20, the intervals between the teeth 3 are only 3 mm each, approximately.

However, when the rotation angle detecting device according to the present invention is used, even in an example in which the shaft angle multiplier is 4, 5, or 7, the number of the teeth 3 is 16 or smaller, and further, may be 12, 10, or 8. Accordingly, because the shaft angle multiplier is made equal to the number of pole pairs of the motor in many cases, the motor with 8 poles, 10 poles, or 14 poles can be driven, and an electric power steering device excellent in mass productivity can be provided. A multipolar motor with concentrated windings, for example, a motor with 8 poles and 12 slots, 10 poles and 12 slots, or 14 poles and 12 slots, may be designed to have a low torque pulsation, and hence the capability of driving such a motor leads to an electric power steering device providing a good steering feel.

When the rotation angle detecting device according to the present invention is used for detecting the rotation angle of the permanent magnet motor mounted on the electric power steering device for a vehicle, the number of the teeth 3 can be set to 16 or smaller.

Further, the number of the teeth 3 can be made smaller than the number obtained by multiplying the shaft angle multiplier by 4. Accordingly, the multipolar motor with 8 poles, 10 poles, or 14 poles can be driven, and hence the torque pulsation of the permanent magnet motor can be reduced. As a result, there is produced an effect of a better steering feel in the electric power steering device.

Further, the rotation angle detecting device according to the present invention has a structure suitable for mass production.

Further, there is produced an effect of a wider range of the selection of the shaft angle multiplier, that is, a wider range of the selection of the number of poles of the motor.

The invention claimed is:

1. A rotation angle detecting device, comprising:
a stator formed of an iron core with teeth, the stator comprising:
an exciting winding of one phase or more; and
output windings of two phases or more; and
a rotor with a salient pole,
wherein numbers of turns of the output windings each have a value obtained by a function containing a sum or a difference between a sine wave of a spatial order equal to an absolute value of a sum of a number M of the salient poles and a number N of pole pairs of excitation, and a sine wave of an order equal to an integer L that is different from an absolute value of the number N of pole pairs of excitation and different from an absolute value of a difference obtained by subtracting the number M of the salient poles from the number N of pole pairs.

2. A rotation angle detecting device, comprising:
a stator formed of an iron core with teeth, the stator comprising:
an exciting winding of one phase or more; and
output windings of two phases or more; and
a rotor with a salient pole,
wherein numbers of turns of the output windings each have a value obtained by a function containing a sum or a difference between a sine wave of an order equal to an absolute value of a difference obtained by subtracting a number M of the salient poles from a number N of pole pairs of excitation, and a sine wave of an order equal to an integer L that is different from an absolute value of the number N of pole pairs of excitation and different from an absolute value of a sum of the number M of the salient poles and the number N of pole pairs.

3. A rotation angle detecting device according to claim 1, wherein numbers of turns $N_{cos}(i)$ and $N_{sin}(i)$, where i is an integer of from 1 to a number $N_S$ of the teeth, of the output windings of the two phases that are wound around an i-th tooth are expressed as follows:

[Expression 8]

$$N_{cos}(i) = N_1 \cos\left((N+M) \times \frac{2\pi(i-1)}{N_s} + \frac{\pi}{N_s} + \theta_1\right) \pm N_2 \cos\left(L \times \frac{2\pi(i-1)}{N_s} + \frac{\pi}{N_s} + \eta_1\right)$$

$$N_{sin}(i) = N_1 \sin\left((N+M) \times \frac{2\pi(i-1)}{N_s} + \frac{\pi}{N_s} + \theta_2\right) \pm N_2 \sin\left(L \times \frac{2\pi(i-1)}{N_s} + \frac{\pi}{N_s} + \eta_2\right)$$

where N represents a number of pole pairs of excitation, M represents a number of the salient poles of the rotor, L represents an integer that is different from the absolute value of the number of pole pairs of the exciting winding and different from the absolute value of the difference obtained by subtracting the number of the salient poles from the number of pole pairs, and $N_1$, $N_2$, $\theta_1$, $\theta_2$, $\eta_1$, and $\eta_2$ each represent arbitrary real numbers.

4. A rotation angle detecting device according to claim 2, wherein numbers of turns $N_{cos}(i)$ and $N_{sin}(i)$, where i is an integer of from 1 to a number $N_S$ of the teeth, of the output windings of the two phases that are wound around an i-th tooth are expressed as follows:

[Expression 9]

$$N_{cos}(i) = N_1 \cos\left((N-M) \times \frac{2\pi(i-1)}{N_s} + \frac{\pi}{N_s} + \theta_1\right) \pm N_2 \cos\left(L \times \frac{2\pi(i-1)}{N_s} + \frac{\pi}{N_s} + \eta_1\right)$$

$$N_{sin}(i) = N_1 \sin\left((N-M) \times \frac{2\pi(i-1)}{N_s} + \frac{\pi}{N_s} + \theta_2\right) \pm N_2 \sin\left(L \times \frac{2\pi(i-1)}{N_s} + \frac{\pi}{N_s} + \eta_2\right)$$

where N represents a number of pole pairs of excitation, M represents a number of the salient poles of the rotor, L represents an integer that is different from the absolute value of the number of pole pairs of the exciting winding and different from the absolute value of the sum of the number of the salient poles and the number of pole pairs, and $N_1$, $N_2$, $\theta_1$, $\theta_2$, $\eta_1$, and $\eta_2$ each represent arbitrary real numbers.

5. A rotation angle detecting device according to claim 1 or 3, wherein an absolute value of the integer L is three times as large as the absolute value of the sum of the number M of the salient poles and the number N of pole pairs.

6. A rotation angle detecting device according to claim 2 or 4, wherein an absolute value of the integer L is three times as large as the absolute value of the difference obtained by subtracting the number M of the salient poles from the number N of pole pairs.

7. A rotation angle detecting device according to claim 1 or 2, wherein the output windings of the two phases are prevented from being wound around at least one of the teeth.

8. A rotation angle detecting device according to claim 1 or 2, wherein the output windings of the two phases having the same number of turns are wound around at least two of the teeth.

9. A rotation angle detecting device according to claim 1 or 2, wherein the numbers of turns of the output windings of the two phases are each expressed as an integer.

10. A rotation angle detecting device according to any one of claims 1 to 4, which detects a rotation angle of a permanent magnet motor mounted on an electric power steering device for a vehicle,
wherein the number of the teeth is 16 or smaller.

* * * * *